United States Patent
Strong, Jr. et al.

(10) Patent No.: US 10,742,037 B2
(45) Date of Patent: Aug. 11, 2020

(54) MANAGING CONSUMER ENERGY DEMAND

(71) Applicant: International Business Machines Corporation, Armonk, NY (US)

(72) Inventors: Hovey R. Strong, Jr., San Jose, CA (US); Raphael I. Arar, Santa Cruz, CA (US); Kevin P. Roche, San Jose, CA (US); Eric K. Butler, San Jose, CA (US); Sandeep Gopisetty, Morgan Hill, CA (US); Manuel Hernandez, Gilroy, CA (US); Pawan R. Chowdhary, San Jose, CA (US); Shubhi Asthana, Santa Clara, CA (US); Cheryl A. Kieliszewski, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 16/025,988

(22) Filed: Jul. 2, 2018

(65) Prior Publication Data

US 2020/0006943 A1      Jan. 2, 2020

(51) Int. Cl.
| | | |
|---|---|---|
| *H02J 3/32* | (2006.01) | |
| *G05B 13/02* | (2006.01) | |
| *H02J 3/00* | (2006.01) | |

(52) U.S. Cl.
CPC .............. *H02J 3/32* (2013.01); *G05B 13/026* (2013.01); *H02J 3/003* (2020.01)

(58) Field of Classification Search
CPC ...... H02J 3/32; H02J 2003/003; G05B 13/026
See application file for complete search history.

(56) References Cited

U.S. PATENT DOCUMENTS

| | | |
|---|---|---|
| 4,032,072 A | 6/1977 | McElhoe et al. |
| 4,256,133 A | 3/1981 | Coward et al. |

(Continued)

FOREIGN PATENT DOCUMENTS

DE    102009040090 A1    3/2011

OTHER PUBLICATIONS

Arar et al., U.S. Appl. No. 16/661,893, filed Oct. 23, 2019.

(Continued)

*Primary Examiner* — Charles R Kasenge
(74) *Attorney, Agent, or Firm* — Zilka-Kotab, P.C.

(57) ABSTRACT

A computer-implemented method, according to one embodiment, includes: receiving an energy consumption profile which spans multiple intervals in a period of time, and predicting a net energy demand of a consumer system over the period of time. Moreover, a first multiple is determined which, when applied to the received energy consumption profile, produces an updated energy consumption profile which corresponds to an amount of energy that is capable of satisfying the predicted net energy demand of the consumer system. A greatest amount of underprediction is estimated. A greatest amount of overprediction is also estimated. Furthermore, an initial state of an energy storage device electrically coupled to the consumer system is computed according to the updated energy consumption profile. The initial state of the energy storage device is also based on a second multiple applied to each of the greatest amount of underprediction, and the greatest amount of overprediction.

18 Claims, 10 Drawing Sheets

(56) References Cited

U.S. PATENT DOCUMENTS

| | | | |
|---|---|---|---|
| 4,646,224 | A | 2/1987 | Ransburg et al. |
| 5,048,755 | A | 9/1991 | Dodds |
| 5,465,904 | A | 11/1995 | Vaello |
| 5,479,338 | A | 12/1995 | Ericksen et al. |
| 5,661,349 | A | 8/1997 | Luck |
| 6,220,293 | B1 | 4/2001 | Rashidi |
| 6,453,215 | B1 | 9/2002 | Lavoie |
| 6,490,505 | B1 | 12/2002 | Simon et al. |
| 6,507,775 | B1 | 1/2003 | Simon et al. |
| 6,694,223 | B1 | 2/2004 | Goldberg et al. |
| 7,339,957 | B2 | 3/2008 | Hitt |
| 7,406,364 | B2 | 7/2008 | Andren et al. |
| 7,526,365 | B1 | 4/2009 | Frerich et al. |
| 8,682,497 | B2 | 3/2014 | Thomas et al. |
| 8,751,036 | B2 | 6/2014 | Darden, II et al. |
| 8,892,264 | B2 * | 11/2014 | Steven .................. G06Q 50/06 700/286 |
| 9,031,703 | B2 * | 5/2015 | Nakamura ........... G05B 13/026 700/278 |
| 9,049,821 | B1 | 6/2015 | Hanna |
| 9,059,929 | B2 | 6/2015 | Sudhaakar et al. |
| 9,146,548 | B2 | 9/2015 | Chambers et al. |
| 9,331,499 | B2 | 5/2016 | Ikriannikov et al. |
| 9,461,546 | B2 | 10/2016 | Freeman et al. |
| 9,569,804 | B2 | 2/2017 | Stein et al. |
| 10,031,503 | B2 * | 7/2018 | Matsumoto ............ G06Q 50/06 |
| 10,338,622 | B2 * | 7/2019 | Nakasone ................ H02J 3/32 |
| 10,693,296 | B2 | 6/2020 | Arar et al. |
| 2003/0179102 | A1 | 9/2003 | Barnes |
| 2007/0044978 | A1 | 3/2007 | Cohen |
| 2010/0191854 | A1 | 7/2010 | Isci et al. |
| 2010/0292856 | A1 | 11/2010 | Fujita |
| 2011/0080044 | A1 | 4/2011 | Schmiegel |
| 2012/0046798 | A1 | 2/2012 | Orthlieb et al. |
| 2013/0124883 | A1 | 5/2013 | Addepalli et al. |
| 2013/0173075 | A1 | 7/2013 | Mitsumoto et al. |
| 2014/0222225 | A1 | 8/2014 | Rouse et al. |
| 2015/0164008 | A1 | 6/2015 | Ferrer Herrera et al. |
| 2015/0167861 | A1 | 6/2015 | Ferrer Herrera et al. |
| 2016/0202682 | A1 * | 7/2016 | Matsumoto ............ G06Q 50/06 700/291 |
| 2016/0209857 | A1 * | 7/2016 | Nakasone ................ H02J 3/32 |
| 2016/0315472 | A1 | 10/2016 | McCullough et al. |
| 2017/0146574 | A1 | 5/2017 | Kuroda et al. |
| 2017/0353033 | A1 | 12/2017 | Kuroda et al. |
| 2018/0323643 | A1 | 11/2018 | Arar et al. |
| 2020/0059096 | A1 | 2/2020 | Arar et al. |

OTHER PUBLICATIONS

Notice of Allowance from U.S. Appl. No. 15/586,145, dated Nov. 13, 2019.

Notice of Allowance from U.S. Appl. No. 15/586,145, dated Jul. 31, 2019.

Chippa et al., "Scalable Effort Hardware Design: Exploiting Algorithmic Resilience for Energy Efficiency," Proceeding of the 47th Design Automation Conference, ACM, 2010, pp. 555-560.

Batool et al., "Self-Organized Power Consumption Approximation in the Internet of Things," Consumer Electronics (ICCE), IEEE International Conference, 2015, pp. 338-339.

Sahana et al., "Home Energy Management Leveraging Open IoT Protocol Stack," IEEE Recent Advances in Intelligent Computational Systems (RAICS), 2015, pp. 370-375.

Gubbi et al., "Internet of Things (IoT): A Vision, Architectural Elements, and Future Directions," Future Generation Computer Systems 29.7, 2013, 1-19.

Yang et al., "An Intelligent Energy Management Scheme with Monitoring and Scheduling Approach for IoT Applications in Smart Home." 2015 Third International Conference on Robot, Vision and Signal Processing (RVSP). IEEE, 2015, pp. 216-219.

Arar et al., U.S. Appl. No. 15/586,145, filed May 3, 2017.

Liu et al., "Markov-Decision-Process-Assisted Consumer Scheduling in a Networked Smart Grid," IEEE Access, Mar. 15, 2017, pp. 2448-2458.

Rocky Mountain Institute, "Demand Response: An Introduction," Apr. 30, 2006, 46 pages retrieved from http://large.stanford.edu/courses/2014/ph240/lin2/docs/2440_doc_1.pdf.

Goldman et al., "Coordination of Energy Efficiency and Demand Response," Ernest Orlando Lawrence Berkeley National Laboratory, Jan. 2010, 74 pages.

Davito et al., "The Smart Grid and the Promise of Demand-side Management," McKinsey on Smart Grid, 2010, pp. 38-44.

Pruggler et al., "Storage and Demand Side Management as power generator's strategic instruments to influence demand and prices," Energy, vol. 36, 2011, pp. 6308-6317.

Akasiadis et al., "Stochastic Filtering Methods for Predicting Agent Performance in the Smart Grid," ECAI Proceedings of the Twenty-first European Conference on Artificial Intelligence, 2014, pp. 1205-1206.

Kota et al., "Cooperatives for Demand Side Management," ECAI'12 Proceedings of the 20th European Conference on Artificial Intelligence, 2012, 6 pages.

Veit et al., "Multiagent Coordination for Energy Consumption Scheduling in Consumer Cooperatives," Proceedings of be Twenty-Seventh AAAI Conference on Artificial Intelligence, Jul. 2013, pp. 1362-1368.

Norford et al., "Non-intrusive electrical load monitoring in commercial buildings based on steady-state and transient load-detection algorithms," Energy and Buildings, vol. 24, 1996, pp. 51-64.

Zoha et al., "Non-Intrusive Load Monitoring Approaches for Disaggregated Energy Sensing: A Survey," Sensors, vol. 12, 2012, pp. 16838-16866.

Jiang et al., "Power Load Event Detection and Classification Based on Edge Symbol Analysis and Support VectorMachine," Applied Computational Intelligence and Soft Computing, Hindawi Publishing Corporation, 2012, pp. 1-10.

Meehan et al., "An Efficient, Scalable Time-Frequency Method for Tracking Energy Usage of Domestic Appliances Using a Two-Step Classification Algorithm," Energies, vol. 7, 2014, pp. 7041-7066.

Deign, J., "Study: flow batteries beat lithium ion," Energy Storage Report, Jul. 19, 2017, 6 pages retrived from http://energystoragereport.info/study-flow-batteries-beat-lithium-ion/.

Deign, J., "The second-life threat to non-lithium batteries," Energy Storage Report, Sep. 4, 2016, 7 pages retrieved from http://energystoragereport.info/the-second-life-threat-to-non-lithium-batteries/#more-4199.

Nadel, S., "Utility Demand-Side Management Experience and Potential—A Critical Review," Annual Review of Energy and the Environment, vol. 17:507-35, 1992, pp. 507-535.

Qureshi et al., "Impact of energy storage in buildings on electricity demand side management," Energy Conversion and Management, vol. 52, 2011, pp. 2110-2120.

List of IBM Patents or Patent Applications Treated as Related.

Non-Final Office Action from U.S. Appl. No. 15/586,145, dated Apr. 15, 2019.

Notice of Allowance from U.S. Appl. No. 15/586,145, dated Feb. 11, 2020.

Corrected Notice of Allowance from U.S. Appl. No. 15/586,145, dated Mar. 24, 2020.

Corrected Notice of Allowance from U.S. Appl. No. 15/586,145, dated Apr. 20, 2020.

* cited by examiner

MANAGING CONSUMER ENERGY DEMAND

BACKGROUND

The present invention relates to energy consumption, and more specifically, this invention relates to the reshaping and management of consumer energy demands.

Electric utilities include companies in the electric power industry which engage in electrical energy generation and/or distribution of electrical energy, where "energy" is the capacity to do work, while "power" is the rate of producing or consuming energy. Moreover, electrical energy is distributed across electrical energy distribution systems, or "grids", which include interconnected networks for delivering electricity from the utilities to consumers.

Advances in renewable energy and Internet of things (IoT) compatible devices have led to greater levels of granularity in terms of assessing the amount of power demanded by consumers from an energy grid. Although conventional analytics provide information which informs both consumers and utility companies how to forecast power consumption, the volatility of demand from individual consumers presents a significant problem to the conventional infrastructure of a utility company. For instance, inconsistencies in consumer demand lead to inefficiencies in the distribution and allocation of resources across industries, thereby resulting in unnecessarily high costs for all parties involved.

Although consumers are able to track their respective demand, metered services monitoring and distribution has conventionally occurred at the service provider level. Moreover, it is greatly undesirable for utility companies to make significant investments to upgrading their technologies in an attempt to overcome this issue without any assurance of achieving improvements. Accordingly, conventional electrical energy distribution systems have been unable to improve operating efficiency.

SUMMARY

A computer-implemented method, according to one embodiment, includes: receiving an energy consumption profile which spans multiple intervals in a period of time, and predicting a net energy demand of a consumer system over the period of time. Moreover, a first multiple is determined which, when applied to the received energy consumption profile, produces an updated energy consumption profile which corresponds to an amount of energy that is capable of satisfying the predicted net energy demand of the consumer system. A greatest amount of underprediction by which the predicted net energy demand of the consumer system underpredicts an actual net energy demand of the consumer system over the period of time is estimated. A greatest amount of overprediction by which the predicted net energy demand of the consumer system overpredicts the actual net energy demand of the consumer system over the period of time is also estimated. Furthermore, an initial state of an energy storage device electrically coupled to the consumer system is computed. The initial state of the energy device is able to satisfy the actual net energy demand of the consumer system according to the updated energy consumption profile. The initial state of the energy storage device is also based on a second multiple applied to each of the greatest amount of underprediction, and the greatest amount of overprediction.

A computer-implemented method, according to another embodiment, includes: receiving an energy consumption profile which spans multiple intervals in a period of time, and predicting a net energy demand of a consumer system over the period of time. A first multiple to apply to the received energy consumption profile to satisfy the predicted net energy demand of the consumer system is determined. The first multiple is determined based on an amount of energy stored in an energy storage device electrically coupled to the consumer system and a total energy storage capacity of the energy storage device. Moreover, an actual net energy demand of the consumer system is fulfilled by performing a process for each of the multiple intervals. The process includes: presenting an energy demand to a utility, the energy demand corresponding to the first multiple applied to a portion of the energy consumption profile which corresponds to the given interval. An amount of energy is received from the utility which corresponds to the energy demand presented to the utility, and a determination is made as to whether the amount of energy received from the utility is less than the actual net energy demand of the consumer system for the given interval. The amount of energy received from the utility is supplemented with energy stored in the energy storage device in response to determining that the amount of energy received from the utility is less than the actual net energy demand of the consumer system for the given interval. However, a difference between the amount of energy received from the utility and the actual net energy demand of the consumer system for the given interval is used to increase the amount of energy stored in the energy storage device in response to determining that the amount of energy received from the utility is not less than the actual net energy demand of the consumer system for the given interval.

A computer program product, according to yet another embodiment, includes a computer readable storage medium having program instructions embodied therewith. The computer readable storage medium is not a transitory signal per se. Moreover, the program instructions are readable and/or executable by a processor to cause the processor to perform a method which includes: receiving, by the processor, an energy consumption profile which spans multiple intervals in a period of time; and predicting, by the processor, a net energy demand of a consumer system over the period of time. Moreover, a first multiple is determined by the processor. The first multiple, when applied to the received energy consumption profile, produces an updated energy consumption profile which corresponds to an amount of energy that is capable of satisfying the predicted net energy demand of the consumer system. A greatest amount of underprediction by which the predicted net energy demand of the consumer system underpredicts an actual net energy demand of the consumer system over the period of time is estimated by the processor. A greatest amount of overprediction by which the predicted net energy demand of the consumer system overpredicts the actual net energy demand of the consumer system over the period of time is also estimated by the processor. Furthermore, an initial state of an energy storage device electrically coupled to the consumer system is computed by the processor. The initial state of the energy device is able to satisfy the actual net energy demand of the consumer system according to the updated energy consumption profile. The initial state of the energy storage device is also based on a second multiple applied to each of the greatest amount of underprediction, and the greatest amount of overprediction.

Other aspects and embodiments of the present invention will become apparent from the following detailed description, which, when taken in conjunction with the drawings, illustrate by way of example the principles of the invention.

DETAILED DESCRIPTION

Figure 1A:
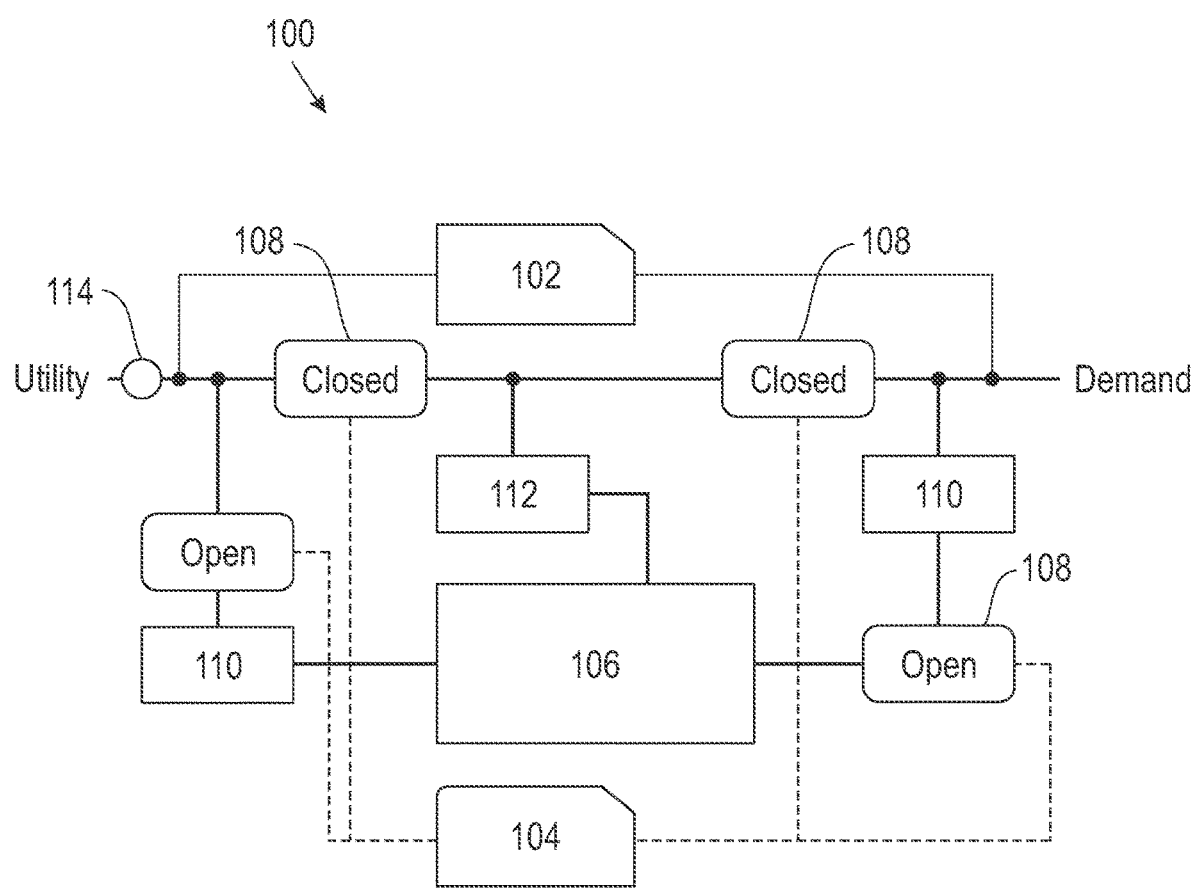
FIG. 1A is a representational view of the interface, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for reshaping the energy demand presented to a utility by a consumer location. Moreover, this reshaping of the energy demand realized by the utility may be achieved without implementing control of energy consumption at the individual consumer locations by a utility, e.g., as will be described in further detail below.

In one general embodiment, a computer-implemented method includes: receiving an energy consumption profile which spans multiple intervals in a period of time, and predicting a net energy demand of a consumer system over the period of time. Moreover, a first multiple is determined which, when applied to the received energy consumption profile, produces an updated energy consumption profile which corresponds to an amount of energy that is capable of satisfying the predicted net energy demand of the consumer system. A greatest amount of underprediction by which the predicted net energy demand of the consumer system underpredicts an actual net energy demand of the consumer system over the period of time is estimated. A greatest amount of overprediction by which the predicted net energy demand of the consumer system overpredicts the actual net energy demand of the consumer system over the period of time is also estimated. Furthermore, an initial state of an energy storage device electrically coupled to the consumer system is computed. The initial state of the energy device is able to satisfy the actual net energy demand of the consumer system according to the updated energy consumption profile. The initial state of the energy storage device is also based on a second multiple applied to each of the greatest amount of underprediction, and the greatest amount of overprediction.

In another general embodiment, a computer-implemented method includes: receiving an energy consumption profile which spans multiple intervals in a period of time, and predicting a net energy demand of a consumer system over the period of time. A first multiple to apply to the received energy consumption profile to satisfy the predicted net energy demand of the consumer system is determined. The first multiple is determined based on an amount of energy stored in an energy storage device electrically coupled to the consumer system and a total energy storage capacity of the energy storage device. Moreover, an actual net energy demand of the consumer system is fulfilled by performing a process for each of the multiple intervals. The process includes: presenting an energy demand to a utility, the energy demand corresponding to the first multiple applied to a portion of the energy consumption profile which corresponds to the given interval. An amount of energy is received from the utility which corresponds to the energy demand presented to the utility, and a determination is made as to whether the amount of energy received from the utility is less than the actual net energy demand of the consumer system for the given interval. The amount of energy received from the utility is supplemented with energy stored in the energy storage device in response to determining that the amount of energy received from the utility is less than the actual net energy demand of the consumer system for the given interval. However, a difference between the amount of energy received from the utility and the actual net energy demand of the consumer system for the given interval is used to increase the amount of energy stored in the energy storage device in response to determining that the amount of energy received from the utility is not less than the actual net energy demand of the consumer system for the given interval.

In yet another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, an energy consumption profile which spans multiple intervals in a period of time; and predicting, by the processor, a net energy demand of a consumer system over the period of time. Moreover, a first multiple is determined by the processor. The first multiple, when applied to the received energy consumption profile, produces an updated energy consumption profile which corresponds to an amount of energy that is capable of satisfying the predicted net energy demand of the consumer system. A greatest amount of underprediction by which the predicted net energy demand of the consumer system underpredicts an actual net energy demand of the consumer system over the period of time is estimated by the processor. A greatest amount of overprediction by which the predicted net energy demand of the consumer system overpredicts the actual net energy demand of the consumer system over the period of time is also estimated by the processor. Furthermore, an initial state of an energy storage device electrically coupled to the consumer system is computed by the processor. The initial state of the energy device is able to satisfy the actual net energy demand of the consumer system according to the updated energy consumption profile. The initial state of the energy storage device is also based on a second multiple applied to each of the greatest amount of underprediction, and the greatest amount of overprediction.

As previously mentioned, advances in renewable energy and IoT compatible devices have led to greater levels of granularity in terms of assessing the amount of power demanded by consumers from an energy grid. However, the volatility of demand from individual consumers presents a significant problem to the conventional infrastructure of utility companies. In fact, it is generally more difficult for a typical electrical utility to handle a volatile energy demand than it is to handle an energy demand that varies from, and even exceeds, the actual volatile energy demand but which also mirrors a prescribed demand profile for a given period of time. While IoT devices provide some insight into energy consumption, utility companies do not have the ability to estimate energy consumption for various consumers. Moreover, it is greatly undesirable for utility companies to make a significant investment to upgrade their technologies in an attempt to overcome this issue without any assurance of success. It follows that the ability to reshape the energy demands imposed by consumers on an electrical grid such that they are more manageable is desired.

In sharp contrast to the foregoing shortcomings of conventional energy grids, various embodiments included herein introduce processes of incentivizing consumers to modify (e.g., reshape) their energy demands over time. While minimizing the total consumer demand for energy has been implemented by controlling the demand schedules of multiple consumers, the ability to influence energy demands such that they mirror one or more prescribed energy consumption profiles on the individual consumer level has not yet been achieved. By influencing energy demands imposed by consumers on an electrical grid, a utility is thereby able to satisfy even larger consumer demands and/or even prevent power outages from occurring. In various approaches, this is achieved by implementing an electrical system which includes independent energy sources, intelligent battery charging components and/or a controlled electrically-consumed system of IoT devices, while also being electrically coupled to a utility in order supplement energy consumption, e.g., as will be described in further detail below.

It follows that various ones of the approaches included herein have a consumer-centric focus. More specifically, some of the approaches herein include transforming consumer-generated internal demands to fit an energy consumption profile for demand which is then presented to an external utility. These demand profiles are preferably prescribed by a utility. Moreover, tariffs which vary depending on the time of day, and which are independent of the amount of energy that has been consumed, are set in some instances by the utility to discourage consumers from deviating significantly from the prescribed energy consumption profiles.

As used herein, a "consumer" may include any entity, e.g., such as a single residential household, a commercial office building, an individual electrically powered component (e.g., a super chiller), more than one residential household, etc., which is coupled to a utility by an electrical grid which includes interconnected wired and/or wireless systems for delivering electricity from the utility to the consumer. In other words, any desired number of components powered by electrical energy may be considered as a "consumer", e.g., depending on the desired embodiment. In some approaches, a consumer also has access to local alternative sources of electrical energy (e.g., wind, solar, geothermal, etc.).

As alluded to above, it is generally more difficult for an electrical utility to handle a volatile energy demand than it is to handle an energy demand that varies from (and even exceeds) an actual volatile energy demand, but which also mirrors a prescribed energy consumption profile for a given period of time. Accordingly, in some approaches a utility implements a time-varying capacity-to-meet-demand (CTMD) which serves as a prescribed energy consumption profile. Moreover, by shaping consumer demands to mirror a prescribed energy consumption profile, the utility is able to contract for and sell a much larger percentage of the CTMD than conventionally achievable where demand is presented independently by the consumers.

This demand-reshaping differs significantly from simple demand peak shifting and neither encourages nor discourages demand minimization. Rather, various ones of the embodiments included herein introduce consumer managed storage and control processes in order to transform consumer demand to better fit a particular demand profile. As a result, consumers are able to benefit from increased privacy, incentive mechanisms, etc. Utilities will also experience reduced overhead regarding monitoring and managing demand spikes. Further still, energy producers will also benefit from the ability to sell increased amounts of energy without incurring increased risk of failure to meet demands.

Looking to FIG. 1A, a representational view of the interface 100 which exists between a utility and a demand of one or more electrically powered components at a given consumer location, is illustrated in accordance with one embodiment. As an option, the present interface 100 may be implemented in conjunction with features from any other embodiment listed herein, such as those described with reference to the other FIGS. However, such interface 100 and others presented herein may be used in various applications and/or in permutations which may or may not be specifically described in the illustrative embodiments listed herein. Further, the interface 100 presented herein may be used in any desired environment. Thus FIG. 1A (and the other FIGS.) may be deemed to include any possible permutation.

Again, the interface 100 exists between a utility and a demand of one or more electrically powered components at a given consumer location. Accordingly, the interface 100 is located at the consumer's location in some approaches. As shown, the interface 100 includes a monitor 102 which is able to deliver a report to both the controller 104 and the utility of the current state of the utility and the amount of energy delivered from it during each standard interval of time (e.g., every 15 minutes) in some approaches. It is in the interest of both the consumer and the utility that the reports provided to each be the same and accurate.

A battery 106 is also depicted as being included in the interface 100. In some approaches, the battery 106 communicates its current state to the controller 104 at each time interval boundary. According to preferred approaches, the "current state" of the battery 106 has two parts which include the amount of energy currently stored in the battery 106, and the remaining energy capacity of the battery 106. It follows that the sum of these two parts represents the total capacity of the battery 106, which is a constant throughout the demand management process.

According to exemplary approaches, the battery 106 may employ energy storage technologies such as Lithium-ion, Vanadium Redox Flow (Flow), zinc hybrid cathode (Znyth), etc. However, any type of energy storage technology which would be apparent to one skilled in the art after reading the present description may be implemented depending on the given approach.

Secondary benefits of consumer energy storage for a consumer without local generation capability (either renewable or backup generation) include improved electric power quality, reduced impact on the consumer of short brownout or blackout events, and graceful shutdown capability for longer power events (e.g., blackouts due to weather, accidents, etc.). However, with local generation capability, benefits expand to include removing power variance in local production (e.g., dips, spikes, gaps, etc.) for local consumption, along with providing cleaner power when the consumer sends power back to the grid.

It follows that in some approaches the controller 104 is used to time multiplex the delivery of energy from both the utility and the battery 106 such that the varying internal demand at the given consumer location is met while also presenting an external demand to the utility which is within a percentage tolerance of current schedule of the controller 104. The controller 104 also uses energy received from the utility to recharge the battery 106 in some approaches.

The present interface 100 additionally includes various switches 108 which are either in an open configuration or a closed configuration. It follows that the switches 108 are used to selectively direct current through the various electrical channels which have been represented by dashed and solid lines. Inverters 110 are also electrically coupled to the battery 106 such that electrical current may be converted from direct current (DC) to alternating current (AC) and vice versa, e.g., depending on the situation. A rectifier 112 is also coupled to the battery 106 which may also be used to convert electrical current from DC to AC and vice versa as would be appreciated by one skilled in the art after reading the present description. Furthermore, a meter 114 is positioned between the interface 100 and the utility. Accordingly, the meter 114 is used in some approaches to keep track of how much electrical energy is provided by the utility.

Figure 1B:
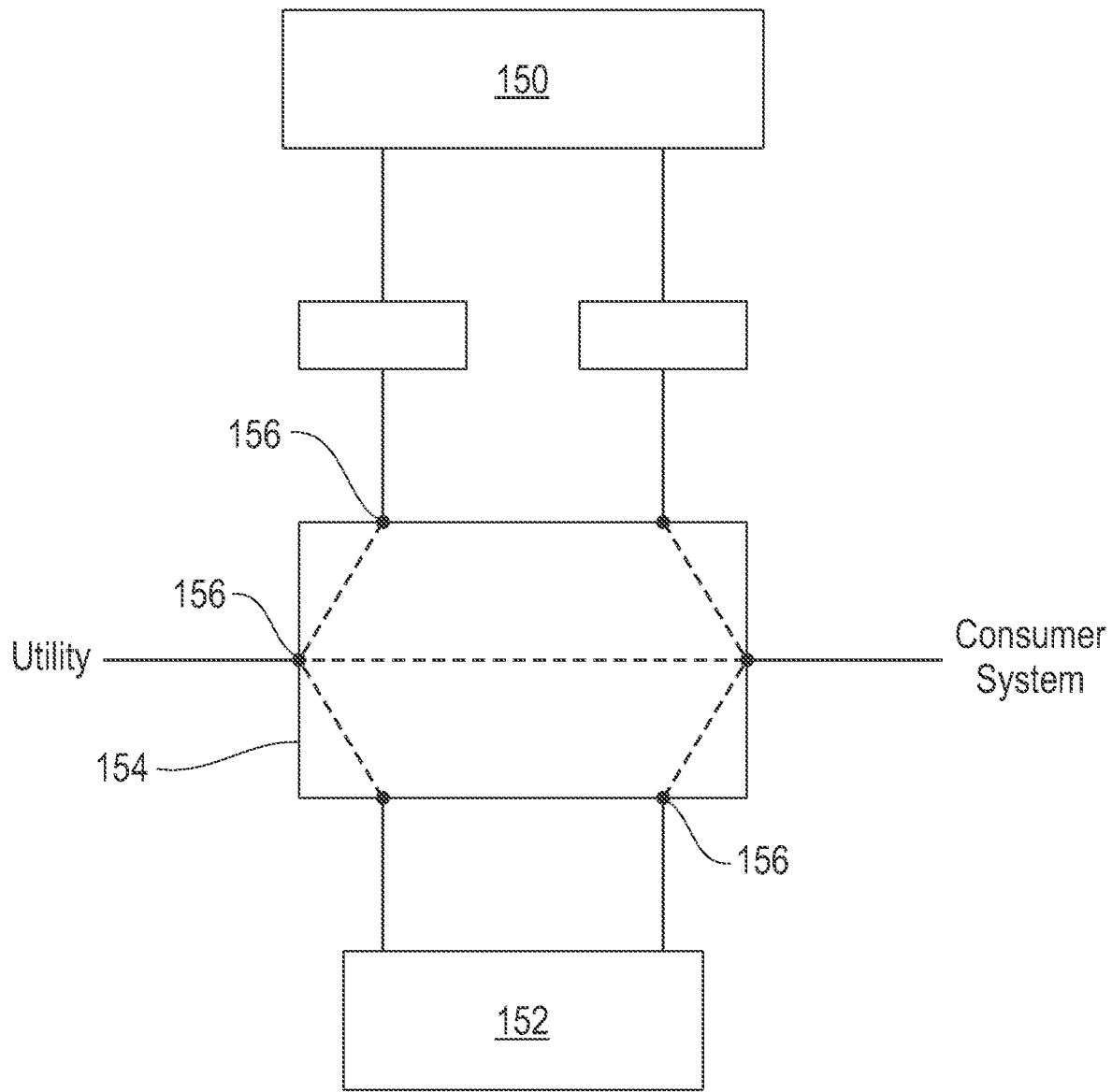
FIG. 1B is a high-level view of an interface and the various components electrically coupled thereto, in accordance with one embodiment.

Looking to FIG. 1B, a high-level view of an interface and the electrical components coupled thereto is illustrated in accordance with one embodiment. As an option, the present embodiment may be implemented in conjunction with features from any other embodiment listed herein, such as those described with reference to the other FIGS., such as FIG. 1A. However, the present embodiment and others presented herein may be used in various applications and/or in permutations which may or may not be specifically described in the illustrative embodiments listed herein. Further, the present embodiment may be used in any desired environment. Thus FIG. 1B (and the other FIGS.) may be deemed to include any possible permutation.

As shown, FIG. 1B illustrates the relationship which exists between the utility, the consumer system, a battery 150 and an independent (e.g., supplemental) energy source 152. Each of these electrical components are coupled to each other through an interface 154 which may include any of the same, similar or different components than those included in the interface 100 of FIG. 1A above. For instance, the interface 154 preferably includes a controller (not shown) which is capable of managing the flow of electricity between the utility, the consumer system, the battery 150 and the independent energy source 152 depending on the given situation. For instance, the relative energy demand or supply experienced along each of the physical connections (e.g., electrical wires) which extend from each of the nodes 156.

According to an example, the consumer system presents an energy demand which is detected by the interface 154. In some approaches, a controller in the interface 154 thereby performs one or more of the various processes and/or sub-processes described herein in order to satisfy the consumer system energy demand using energy supplied by the utility, the battery 150 and/or the independent energy source 152. According to another example, the interface 154 routes electrical energy created by the independent energy source 152 to the consumer system, the battery 150 and/or the utility depending on the relative current energy demands. According to yet another example, the battery 150 is routed electrical energy from both the utility and the independent energy source 152 in some situations where the consumer system is experiencing low energy demands.

The interface 154, the battery 150 and the independent energy source 152 are located at the same location as the consumer system in some approaches. Thus, a user at the consumer system location is able to configure various electrical storage components, electrical management components and/or electrical production components, e.g., depending on the desired approach. For example, while the battery 150 is coupled to the utility and the local independent energy source 152, an independent energy source is present in other approaches. It should also be noted that power converters 158, 160 are positioned between the interface 154 and the battery 150. Thus, electrical energy received from the utility, the independent energy source 152 and/or back from the consumer system itself are convertible from AC to DC by a first of the power converter 158, such that it can be stored in the battery 150. A second of the power converters 160 is used to convert electrical energy stored in the battery 150 from DC to AC in some approaches, such that it can be used by various electrical components included in the consumer system, sold back to the utility, etc.

For purposes of forecasting and operation, time may be partitioned into periods (e.g., calendar days) and each period may further be partitioned into homogeneous intervals (e.g., 96 intervals per calendar day). The various embodiments included herein are preferably able to maintain a battery state (e.g., charge) which is between empty and full throughout each interval of a given period, thereby providing feasibility in being able to satisfy consumer demand throughout each period. Moreover, it is also preferred that the state of the battery at the end of a given period is the same as (or at least substantially similar to) the state the battery had at the beginning of that period, thereby providing sustainability. It follows that some of the approaches included herein are directed to processes which estimate desired battery states depending on various system settings. Moreover, these processes are desirably able to maintain battery states which do not trend away from an original (starting) state over multiple periods.

In order to achieve this maintained use and sustainability, a controller at a consumer location receives a demand schedule which, for each interval in the upcoming period, provides a preferred forecast consumer demand and specific total target demand to be presented to the utility. According to different approaches, the demand schedule is optimizable based on forecast demands for the consumer, forecast utility CTMD for the specific consumer, forecast electricity spot prices, etc. In some approaches the demand schedule also has a forecast state for the battery at the end of each interval, assuming the demand and CTMD forecasts have been represented accurately. Thus, the controller is provided a target battery state at the end of each interval and is able to make corrections in each interval for any differences which exist between the forecast battery state and a target battery state in the previous interval. In some approaches, a source for the correction is a specified tolerance the given utility has for small changes from the preferred consumer demand shape. In other approaches, processes involving schedule construction are used as a source for correction and/or in order to shaping demand, e.g., as will be described in further detail below.

At the interface between a consumer and the utility, a time-varying maximum CTMD exists in some approaches. According to an example, which is in no way intended to limit the invention, the utility sets fixed prices for energy that is provided to the consumer based on the specific time-of-day. Ignoring the cost of an energy storage device with capacity sufficient for the demand experienced over one day, a consumer would benefit from demanding and storing all energy needs for the day during the time which corresponds to the cheapest price per unit of energy. However, if this tactic is implemented in a widespread fashion, performance experienced by the utility would suffer as energy would only be sold during the lowest price period, while no energy would be sold during any of the other higher priced periods. In sharp contrast, the utility is able to offer a discount for those consumers that present a time-varying energy demand that mirrors (e.g., within a small percentage threshold of) an amount which is proportional to a corresponding portion of a prescribed energy consumption profile (e.g., a forecast CTMD) provided by the utility. Accordingly, the "shape" of consumer demand over a period adjustable such that it meets the prescribed energy consumption profile within a small percentage tolerance at each interval throughout the period. Moreover, processes for estimating the storage capacity involved with achieving this demand profile matching may be implemented as described in the various approaches included herein.

Figure 2A:
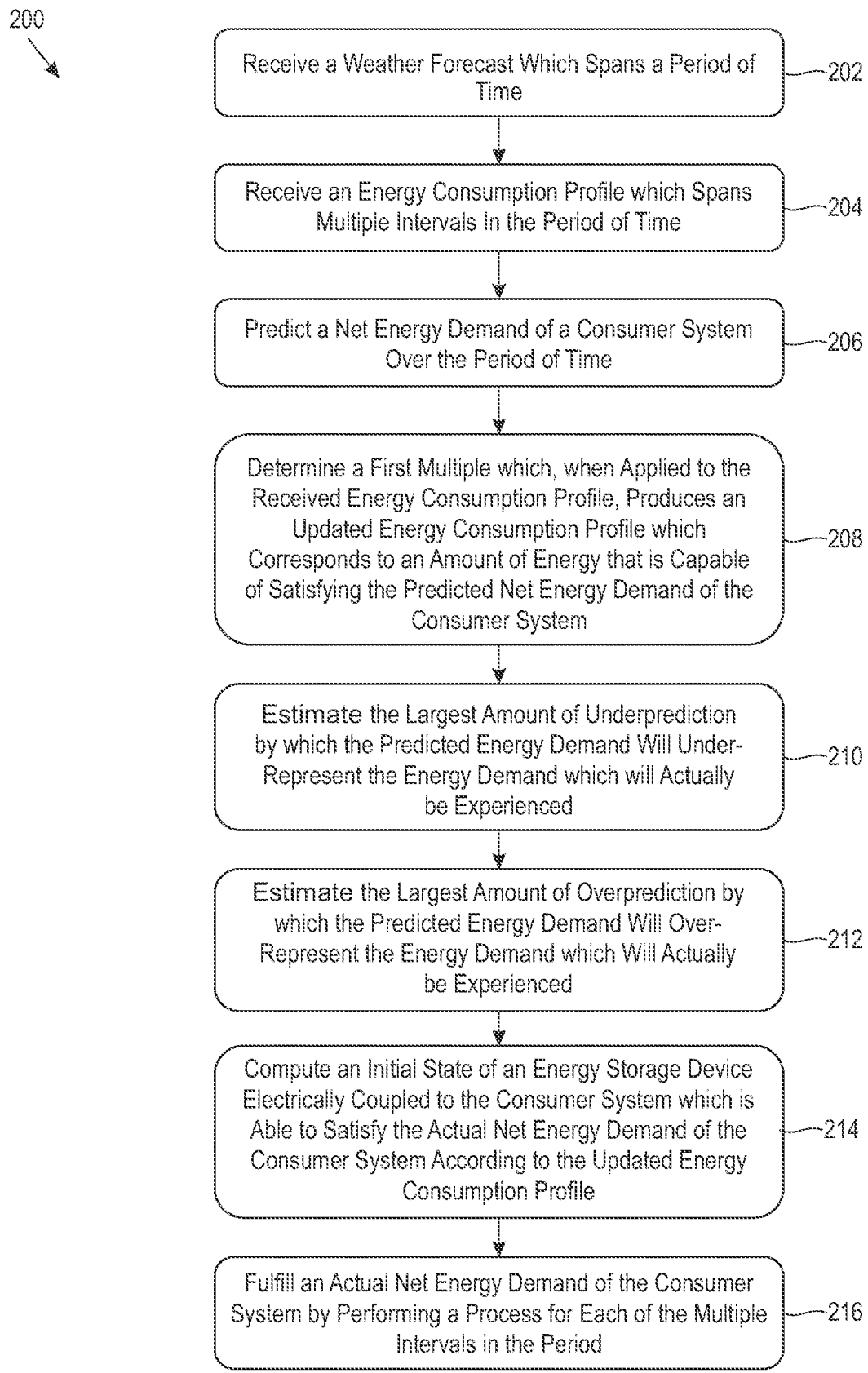
FIG. 2A is a flowchart of a method, in accordance with one embodiment.

Looking now to FIG. 2A, a flowchart of a method 200 for estimating a battery capacity capable of satisfying a consumer energy demand over a period of time, is shown according to one embodiment. The method 200 may be performed in accordance with the present invention in any of the environments depicted in FIG. 1A, among others, in various embodiments. Of course, more or less operations than those specifically described in FIG. 2A may be included in method 200, as would be understood by one of skill in the art upon reading the present descriptions.

Each of the steps of the method 200 may be performed by any suitable component of the operating environment. For example, any one or more of the processes included in method 200 may be performed by a controller at an interface between a consumer and a utility (e.g., see 104 of FIG. 1A). Moreover, in various other embodiments, the method 200 may be partially or entirely performed by a controller, a processor, a computer, etc., or some other device having one or more processors therein. Thus, in some embodiments, method 200 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 2A, operation 202 of method 200 includes receiving a weather forecast which spans a period of time. As alluded to above, weather conditions are capable of having a significant effect on consumer energy demands. Accordingly, weather forecasts serve as valuable information in predicting the energy demands output by various consumers. An exemplary list of the types of weather-based information which may be included in the weather forecast includes, but is not limited to, temperature, humidity (e.g., represented as an integer percent), available solar energy, available wind energy, etc. Additional information such as historical trends, scheduled events, time of year, etc., also serves as valuable information when attempting to predict the energy demand of a given consumer. Thus, in some approaches operation 202 includes receiving additional and/or different information which corresponds to a consumer system which corresponds to the consumer energy demand, e.g., depending on the approach.

As previously mentioned, a "consumer" may include a single residential household, a commercial office building, an individual electrically powered component (e.g., a super chiller), more than one residential household, etc., coupled to an electrical grid which includes interconnected wired and/or wireless systems for delivering electricity from the utilities to consumers. In other words, any desired number of components powered by electrical energy may be considered as a "consumer", e.g., depending on the desired embodiment.

Looking to operation 204, method 200 includes receiving an energy consumption profile which spans multiple intervals in the period of time. As described above, prescribed energy consumption profiles are produced by a utility in some approaches. Accordingly, the energy consumption profile is received from a utility in some approaches. The energy consumption profile also preferably spans the same period of time as the weather forecast (and potentially other information) received in operation 202.

Figure 3:
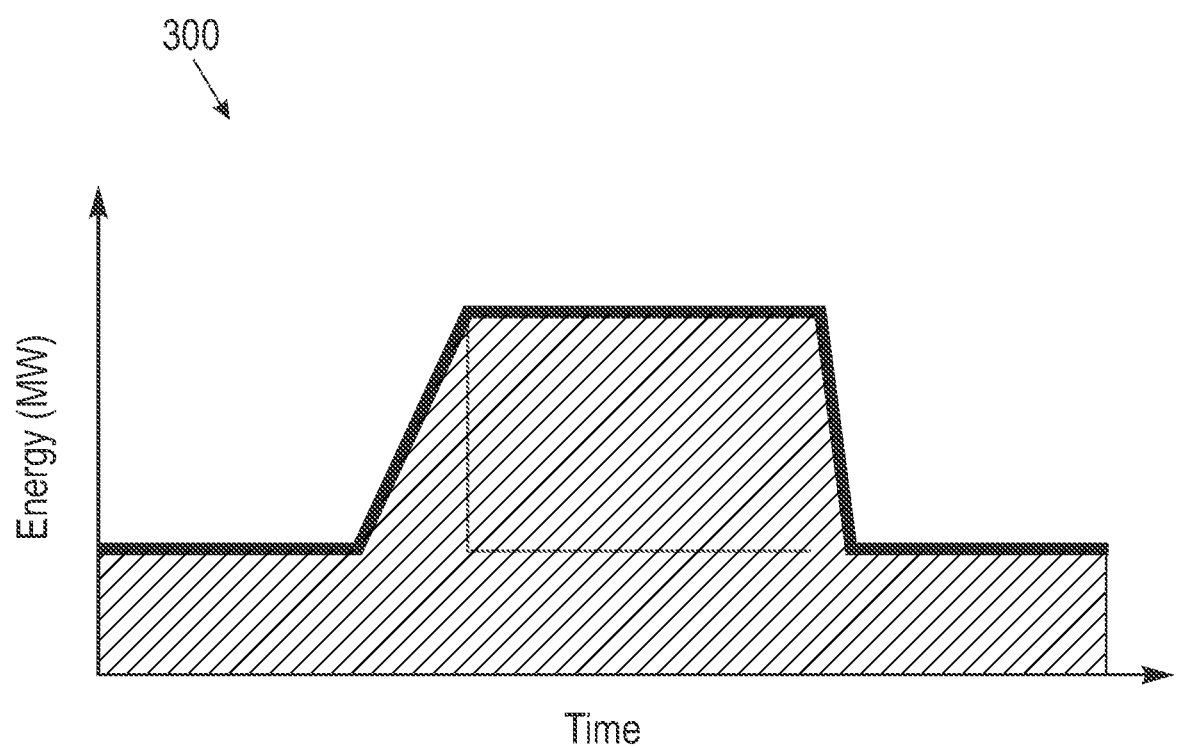
FIG. 3 is a graph which includes a plot of energy vs. time, in accordance with one embodiment.

Referring momentarily to FIG. 3, an exemplary prescribed energy consumption profile 300 is illustrated in accordance with one embodiment. As shown, the prescribed energy consumption profile 300 provides a general "shape" which specifies relative energy demand levels that correspond to the different times (intervals) of the given period. For example, the period spans a 24-hour day, beginning at midnight and extending to 11:59 PM the same calendar day. According to this example, the prescribed energy consumption profile 300 specifies that energy demands are preferably lower in the mornings and nights compared to energy demands experienced during the middle of the day. In other words, the prescribed energy consumption profile 300 specifies that mornings and nights are off-peak times in some approaches. Thus, it is possible to incentivize a consumer to reduce an energy demand presented to the utility during mornings and nights compared to the middle of the day. In some approaches, this is achieved by relying on supplemental energy resources to supplement the amount of energy received from the utility and meet actual energy demands of the consumer. These supplemental energy resources may include a battery bank, an independent energy source located locally (e.g., a wind turbine), etc. Moreover, excess energy received during increased demand times in the middle of the day can be used to recharge supplemental energy resources which were exerted to compensate for the low energy demand presented to the utility during mornings and nights, e.g., as will be described in further detail below.

Referring again to FIG. 2A, method 200 includes predicting a net energy demand of a consumer system over the period of time. See operation 206. As mentioned above, the various processes included in method 200 may be implemented for estimating a battery capacity that is capable of satisfying a consumer energy demand of a consumer system over a period of time. Accordingly, a prediction of the net energy demand for the consumer system serves as valuable information in order to estimate a battery capacity that is capable of satisfying such a demand in some approaches.

The net energy demand of the consumer system is predicted differently depending on the information which is available, user preferences, the desired approach, etc. For instance, in some approaches predicting the net energy demand of the consumer system over a given period of time is based on a net and/or actual energy demand of the consumer system which was experienced over a previous period of time. Moreover, the previous period of time preferably has similarities with the given period of time for which the net energy demand is being predicted. According to an example, a net energy demand predicted for a consumer over a 12-hour period on a Wednesday in July is based on the actual energy demand experienced by the same consumer over the same 12-hour period on the previous Wednesday the week before.

Method 200 further includes determining a first multiple which, when applied to the received energy consumption profile, produces an updated energy consumption profile which corresponds to an amount of energy that is capable of satisfying the predicted net energy demand of the consumer system. See operation 208. As mentioned above, it is preferred that the general "shape" of the energy demand which is presented to a utility mirrors the "shape" of a prescribed energy consumption profile. Accordingly, the net energy demand predicted for the consumer system in operation 206 is compared against the prescribed energy consumption profile received in operation 204 in some approaches. Depending on whether the prescribed energy consumption profile exceeds or falls short of the predicted net energy demand, the prescribed energy consumption profile is adjustable while maintaining the same general "shape".

According to an example, the prescribed energy consumption profile is determined to fall short of the predicted net energy demand for the consumer system. Accordingly, a non-zero, positive multiple can be applied to the prescribed energy consumption profile such that the entire profile is raised by a same amount, thereby maintaining the same shape. It follows that the multiple which is ultimately applied to the prescribed energy consumption profile is preferably sufficient to adjust the profile such that the net energy demand of the consumer system is met.

While the adjusted energy consumption profile is capable of meeting the net energy demand of a given consumer system over a full period of time, the adjusted energy consumption profile may actually be higher or lower than the energy demand experienced at various ones of the intervals across the period. In other words, the adjusted energy consumption profile will often times not be identical to a profile of the actual energy demand across the same period. According to an example, which is in no way intended to limit the invention, while the actual energy demand profile and the adjusted energy consumption profile may be represented by different plots on a graph (e.g., as seen in FIG. 3), the total area under each of the respective plots is preferably the same. As a result, the energy demands for a given consumer may be met in a manner which also benefits the utility.

As mentioned above, supplemental energy resources, e.g., such as one or more batteries, used in some approaches to compensate for any differences between the adjusted energy consumption profile and the actual net energy demand profile of the consumer system in the period. For instance, electrical energy which has been stored in one or more batteries is available for consumption during intervals of the period during which the adjusted energy consumption profile falls short of the actual energy demand, thereby compensating for the portions of the adjusted energy consumption profile which fall short. Moreover, excess electrical energy corresponding to intervals of the period during which the adjusted energy consumption profile exceeds the actual energy demand is available to recharge the one or more batteries, e.g., as will be described in further detail below.

According to an exemplary embodiment, the first multiple may be determined using Equation 1 as follows.

$$\frac{E_P + E_R}{E_A} \qquad \text{Equation 1}$$

Here, $E_P$ represents the predicted energy demand for a single period (e.g., day). $E_R$ represents the amount of energy involved with returning the energy storage device to a storage state (charge level) at the end of the period which is the same or at least similar to the storage state at the beginning of the period. Furthermore, $E_A$ represents the total amount of energy demanded according to the received energy demand profile for the period. However, other equations and/or processes may be used to determine the first multiple depending on the approach, e.g., as would be appreciated by one skilled in the art after reading the present description.

Referring still to FIG. 2A, method 200 proceeds to operation 210 once a desirable first multiple has been determined. There, operation 210 includes estimating a greatest amount of underprediction by which the predicted net energy demand of the consumer system underpredicts an actual net energy demand of the consumer system over the period of time. In other words, operation 210 includes estimating a "greatest total negative error" representing the largest amount by which the predicted energy demand will under-represent (e.g., fall short of) the energy demand which will actually be experienced.

According to some approaches, this estimation is determined based on past behavior of the given consumer system with respect to predicted energy demands. For example, a specific consumer system consistently exceeds predicted energy demands in response to a particular weather-based event occurring, at certain times during the given period, etc. Thus, past behavior provides insight on how a particular consumer system is going to act. Although past behavior is preferably considered when initially determining the predicted net energy demand of the consumer system, certain metrics update over time, be too inconsistent to be used to make demand predictions, etc.

Similarly, operation 212 includes estimating a greatest amount of overprediction by which the predicted net energy demand of the consumer system overpredicts the actual net energy demand of the consumer system over the period of time. In other words, operation 212 includes estimating a "greatest total positive error" representing the largest amount by which the predicted energy demand will over-represent (e.g., exceed) the energy demand which will actually be experienced. As described above, this estimation is based on past behavior of the given consumer system with respect to predicted energy demands in some approaches. Accordingly, any of the approaches described herein may be implemented in order to perform operation 212.

Moving to operation 214, method 200 further includes computing an initial state of an energy storage device electrically coupled to the consumer system which is able to satisfy the actual net energy demand of the consumer system according to the updated energy consumption profile. In other words, operation 214 includes computing an initial state of an energy storage device (e.g., one or more batteries) such that it is able to compensate for any differences between the updated energy consumption profile and the actual net energy demand experienced by the consumer system. With respect to the present description, the "initial state" of the energy storage device includes a total capacity of the energy storage device, and/or an initial amount of energy stored in the energy storage device. In other words, the initial state of the energy storage device defines the desired energy storage profile of the energy storage device in some approaches.

According to preferred approaches, the initial state is computed based on the greatest amount of underprediction as well as the greatest amount of overprediction determined in operations 210 and 212, respectively. A second multiple may also be applied to the greatest amount of underprediction and/or the greatest amount of overprediction to compute the initial state of the energy storage device in some approaches. According to preferred approaches, the second multiple is as small as possible. Moreover, the second multiple is determined differently depending on the give embodiment.

For instance, in some exemplary embodiments the second multiple may be determined (e.g., computed) by starting with a "trial value" of zero and progressively adding a predetermined threshold amount to the trial value until the second multiple, when applied to the greatest amount of underprediction and the greatest amount of overprediction, results in an initial state of the energy storage device which is able to satisfy the actual net energy demand of the consumer system over multiple days.

Figure 2B:
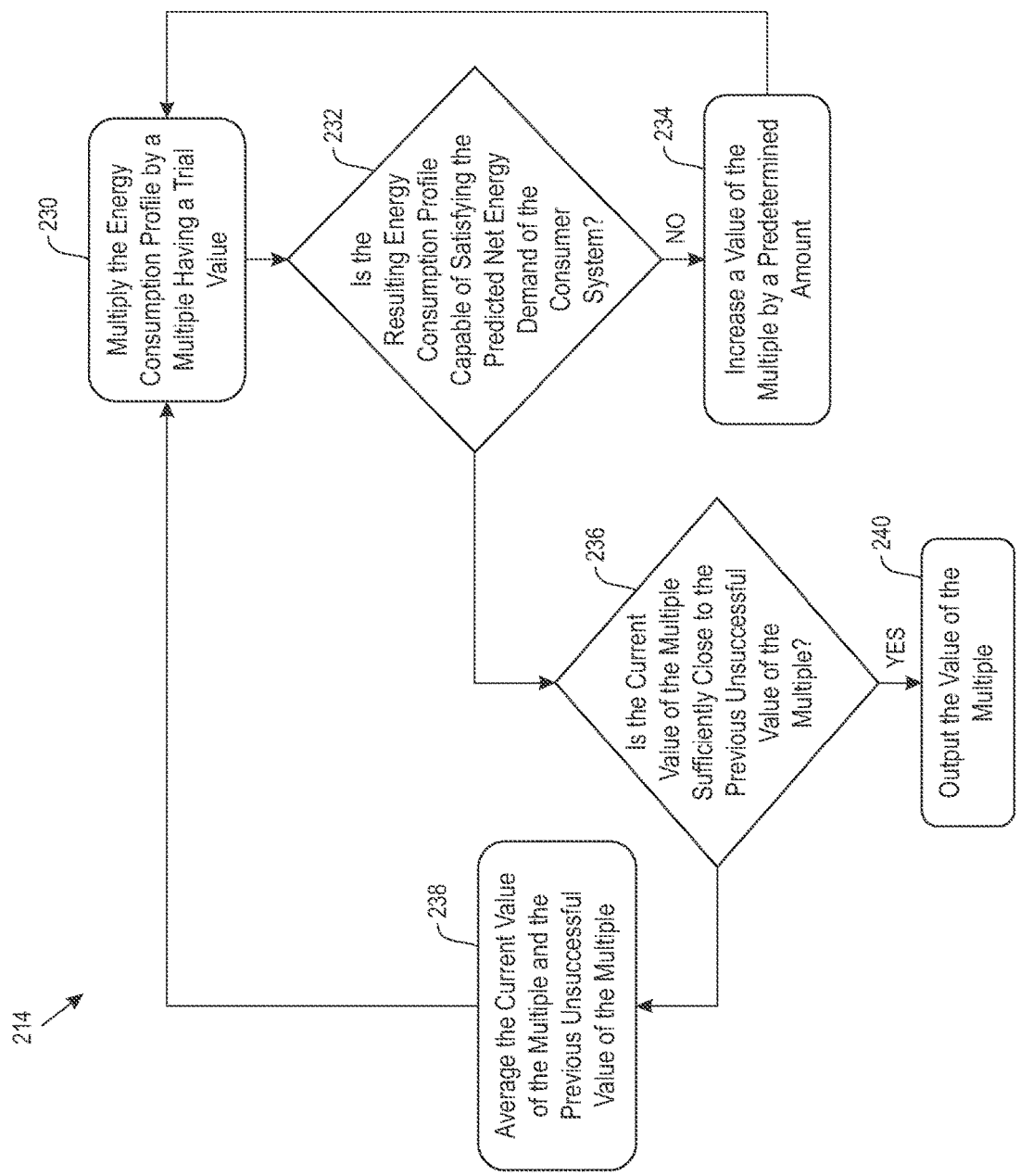
FIG. 2B is a flowchart of sub-processes for one of the operations in the method of FIG. 2A, in accordance with one embodiment.

Referring momentarily now to FIG. 2B, exemplary sub-processes of determining the second multiple are illustrated in accordance with another embodiment, one or more of which may be used in the process of performing the computation in operation 214 of FIG. 2A. However, it should be noted that the sub-processes of FIG. 2B are illustrated in accordance with one embodiment which is in no way intended to limit the invention.

As shown, the flowchart of FIG. 2B includes multiplying the energy consumption profile by a multiple having a trial value. See sub-operation 230. In some approaches this trial value is trivial in that it is randomly selected, predetermined, calculated in real time, based on one or more current conditions, etc. For example, the trial value initially implemented in operation 230 is set as 0.5. Moreover, decision 232 includes determining whether the resulting energy consumption profile is capable of satisfying the predicted net energy demand of the consumer system. This determination may be made using any of the approaches described herein and/or which would be apparent to one skilled in the art after reading the present description.

The flowchart proceeds to sub-operation 234 in response to determining that the resulting energy consumption profile is not capable of satisfying the predicted net energy demand of the consumer system. There, sub-operation 234 includes increasing a value of the multiple by a predetermined amount. According to an illustrative approach, sub-operation 234 includes doubling the previous value of the multiple. In other approaches, a fixed value is added to the multiple, a predetermined equation is applied to the multiple, etc.

From sub-operation 234, the flowchart of FIG. 2B returns to sub-operation 230, whereby the energy consumption profile is multiplied by the increased value of the multiple. Moreover, decision 232 is repeatable in order to determine whether the energy consumption profile resulting from the increased value of the multiple is capable of satisfying the predicted net energy demand of the consumer system. It follows that sub-processes 230, 232 and 234 are repeatable in an iterative fashion until a resulting energy consumption profile is capable of satisfying the predicted net energy demand of the consumer system.

In some approaches, the flowchart ends in response to determining that the resulting energy consumption profile is capable of satisfying the predicted net energy demand of the consumer system. In some approaches, the value of the multiple is output, e.g., for actual implementation. However, in other approaches the value of the multiple is further refined in order to further increase performance efficiency. Accordingly, decision 236 included determining whether a difference between the current value of the multiple and a most recent value of the multiple, which resulted in the flowchart proceeding to sub-operation 234 from decision 232, is in a range. In other words, decision 236 includes determining whether the current value of the multiple and the previous unsuccessful value of the multiple are sufficiently close to each other.

Referring still to FIG. 2B, the flowchart proceeds to sub-operation 238 in response to determining that the current value of the multiple and the previous unsuccessful value of the multiple are not sufficiently close to each other. There, sub-operation 238 includes averaging the current value of the multiple and the previous unsuccessful value of the multiple. From sub-operation 238, the flowchart returns to sub-operation 230 and sub-processes 230, 232 and 234 are repeatable, e.g., as described above.

Returning to decision 236, the flowchart proceeds to sub-operation 240 in response to determining that the current value of the multiple and the previous unsuccessful value of the multiple are sufficiently close to each other. There, sub-operation 240 includes outputting the value of the multiple, e.g., such that it is implemented depending on the approach. It follows that in some approaches, sub-processes 236 and 238 are performed in an iterative fashion along with sub-processes 230, 232 and 234, e.g., as would be appreciated by one skilled in the art after reading the present description.

It follows that the second multiple may be considered as being a prediction error multiple (PEM). It should be noted that the size of the PEM is a measurement of how much improvement could be obtained by improving prediction. In some approaches the second multiple is able to estimate an adequate initial energy storage device state by computing (PEM×(the greatest energy under-prediction)+(the minimal initial energy state) as well as (PEM*((the greatest energy under-prediction)+(the greatest energy over-prediction)))+ (the minimal energy capacity of the energy storage device).

Figure 2C:
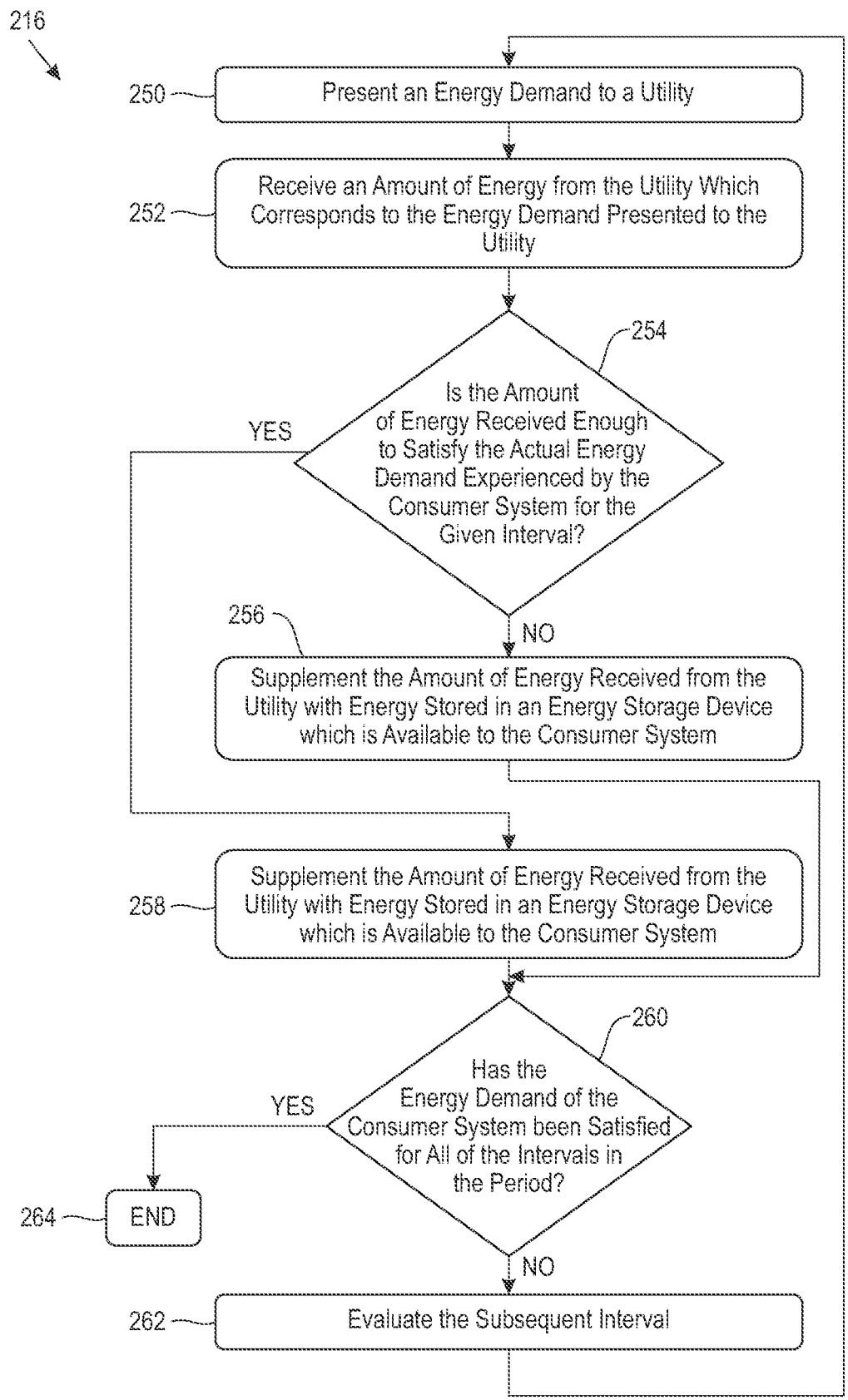
FIG. 2C is a flowchart of sub-processes for one of the operations in the method of FIG. 2A, in accordance with one embodiment.

Referring again to FIG. 2A, an actual net energy demand of the consumer system is fulfilled by performing a process for each of the multiple intervals which are included in the period. See operation 216. In other words, operation 216 includes actually satisfying the energy demands of the consumer system at each of the intervals in the period of time. Looking now to FIG. 2C, exemplary sub-processes of actually satisfying the energy demands of the consumer system at each of the intervals in the period are illustrated in accordance with one embodiment, one or more of which can be used to perform operation 216 of FIG. 2A. However, it should be noted that the sub-processes of FIG. 2C are illustrated in accordance with one embodiment which is in no way intended to limit the invention. For example, while the various sub-processes included in FIG. 2C may be performed by a controller (e.g., processor, control unit, computer, etc.) at the consumer system location, any one or more of these sub-processes may be performed by a controller which is located at a different location along the energy delivery grid between the utility and the consumer system and/or which is removed therefrom.

As shown, FIG. 2C includes presenting an energy demand to a utility. See sub-operation 250. The energy demand presented to the utility preferably corresponds to (e.g., is equal to) a portion of the updated energy consumption profile which corresponds to the given interval of the period. Moreover, sub-operation 252 includes receiving an amount of energy from the utility which corresponds to (e.g., is equal to) the energy demand presented to the utility in sub-operation 250. Depending on how the consumer system is coupled to the utility, the energy received in sub-operation 252 may be received differently, e.g., along a power line, a physical connection to an electrical base-station, etc.

Moreover, decision 254 includes determining whether the amount of energy received from the utility is less than the actual net energy demand of the consumer system for the given interval. In other words, decision 254 includes determining whether the amount of energy received is enough to satisfy the actual energy demand experienced by the consumer system for the given interval. The flowchart proceeds to sub-operation 256 in response to determining that the amount of energy received is not enough to satisfy the actual energy demand experienced by the consumer system for the given interval. There, sub-operation 256 includes supplementing the amount of energy received from the utility with energy stored in an energy storage device which is available to the consumer system. As described above, energy stored in the energy storage device may be used throughout a given period to supplement the amount of energy received from a utility. Thus, although the demand presented by the consumer system to the utility may be less than the actual energy demand of the consumer system, performance of the consumer system does not suffer from a lack of energy.

Returning to decision 254, the flowchart proceeds to sub-operation 258 in response to determining that the amount of energy received is enough to satisfy the actual energy demand experienced by the consumer system for the given interval. There, sub-operation 258 includes using a difference between the amount of energy received from the utility and the actual net energy demand of the consumer system for the given interval to increase the amount of energy stored in the energy storage device. Again, any energy received from the utility which exceeds the energy demand of the consumer system for the given interval is preferably used to recharge the energy storage device such that it is adequately charged to compensate for intervals for which the amount of energy received from the utility is less than the energy demand of the consumer system.

Furthermore, the flowchart proceeds to decision 260 from both sub-operation 256 and sub-operation 258. As shown, decision 260 includes determining whether the energy demand of the consumer system has been satisfied for all of the intervals in the period. In other words, decision 260 includes determining whether the energy demand of the consumer system has been satisfied for the entire period. The flowchart proceeds to sub-operation 262 in response to determining that the energy demand of the consumer system has not been satisfied for all of the intervals in the period, whereby the subsequent interval is evaluated before returning to sub-operation 250.

However, in response to determining that the energy demand of the consumer system has been satisfied for all of the intervals in the period, the flowchart proceeds to sub-operation 264 whereby the process illustrated in FIG. 2C ends.

It follows that the various processes and sub-processes described above with respect to FIGS. 2A-2C are able to reshape the energy demands of consumer systems such that they mirror prescribed energy consumption profiles. Utilities are able to design energy consumption profiles which allow for consumer demands to be met in a way which is beneficial to the utility without forcing consumers to reduce and/or adjust their actual energy use. As a result, both utilities and consumers are able to experience improved performance without sacrificing performance, which conventionally has been unachievable.

It should also be noted that certain assumptions may be made in order to estimate the storage capacity involved with achieving an energy demand profile which matches an energy consumption profile prescribed by a utility. For instance, in some approaches it is assumed that the predicted internal demand of the consumer accurately matches the internal demand which is actually experienced by the consumer. Moreover, in some approaches searches for a sufficient battery state and/or size (e.g., charging capacity) are based on historical consumption data and/or a simulator which is able to predict internally generated demands while compensating for prediction errors, e.g., as would be appreciated by one skilled in the art after reading the present description.

According to an in-use example, which is in no way intended to limit the invention, an estimator module is used to estimate a battery state which is capable of adequately supplementing the energy demands of a given consumer system. According to the present example, the estimator module is given two inputs: shape "C[ ]" and forecast internal demand "D[ ]". Define AggregateC[x]=def Sum{C[y]10<=y<=x} and AggregateD[x]=def Sum{D[y] 10<=y<=x}. The estimator module is operated in a stand-alone fashion, or as the first module of a simulator and/or schedule executor. For approaches in which the estimator module is operated as part of a simulator executor, it is given two additional inputs: the actual battery state "B[Estart=energy stored, remaining battery capacity]"; and Tolerance (the percentage difference allowed), for each interval in a given period. Given this information, the estimator module is able to consider whether the demand presented matches a specified shape, e.g., such as that of a prescribed energy consumption profile. A match exists between shape C[ ] and the actual demand presented "Cactual[ ]" when a constant Cm exists such that |Cactual[x]]−Cm*C[x]|<=|Tolerance*Cm*C[x]|, for each interval x. Stand-alone mode is signaled by B=[0,0] and Tolerance=0. In stand-alone mode the estimator module computes the minimum battery capacity which is able to achieve an accurate prediction "Full_min".

While the approaches described above are desirable in that they are able to satisfy consumer energy demands in an efficient and beneficial manner, it is also desirable that the amount of energy stored in a battery at the consumer location is the same at the end of a period as it was at the beginning of the period. In other words, it is desirable that the net difference in energy charging and use over a given period of time is about zero. As a result, a prescribed energy consumption profile is implemented, beginning with the battery in a starting state, iterating through the various intervals of the period, and ending up with the battery in an ending state which is the same as (or at least substantially similar to) the starting state. This allows for the battery to function nominally over a multitude of periods without triggering any intervention from a user, consumer system administrator, utility provider, etc.

Figure 4A:
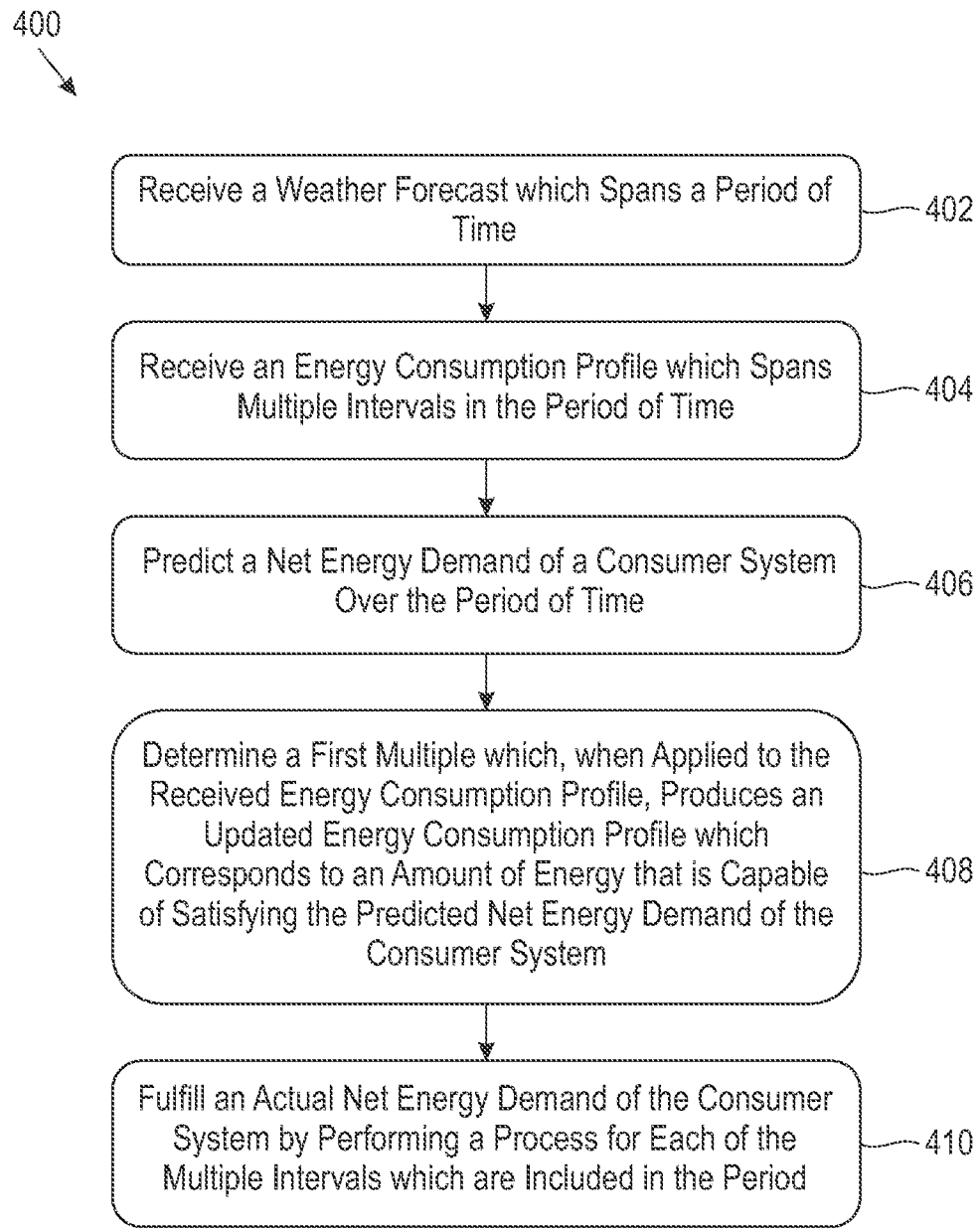
FIG. 4A is a flowchart of a method, in accordance with one embodiment.

Accordingly, looking to FIG. 4A, a method 400 for presenting an energy demand to a utility that is a multiple of an energy consumption profile while managing the charge state of a battery at the consumer system, is shown according to one embodiment. The method 400 may be performed in accordance with the present invention in any of the environments depicted in FIG. 1A, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, any one or more of the processes included in method 400 may be performed by a controller at an interface between a consumer and a utility (e.g., see 104 of FIG. 1A). Moreover, in various other embodiments, the method 400 may be partially or entirely performed by a controller, a processor, a computer, etc., or some other device having one or more processors therein. Thus, in some embodiments, method 400 may be a computer-implemented method. In such embodiments, the computer used to implement the method may include the tape drive itself or a portion thereof such as the controller, the tape, an external host, a server, etc. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes receiving a weather forecast which spans a period of time. As mentioned above, weather conditions have a significant effect on consumer energy demands. Accordingly, weather forecasts serve as a valuable information in predicting the energy demands output by various consumers. Additional information such as historical trends, scheduled events, time of year, etc., also serve as valuable information when attempting to predict the energy demand of a given consumer. Thus, in some approaches operation 402 includes receiving additional and/or different information which corresponds to a consumer system which corresponds to the consumer energy demand, e.g., depending on the approach.

Method 400 also includes receiving an energy consumption profile which spans multiple intervals in a period of time. See operation 404. The energy consumption profile may implement any of the approaches described above, e.g., with respect to method 200. Thus, in some approaches the energy consumption profile is prescribed by and/or received from a utility.

Moreover, operation 406 includes predicting a net energy demand of a consumer system over the period of time. As previously mentioned, the net energy demand of the consumer system is predicted differently depending on the information which is available, user preferences, the desired approach, etc. For instance, in some approaches predicting the net energy demand of the consumer system over a given period of time is based on a net and/or actual energy demand of the consumer system which was experienced over a previous period of time. Moreover, the previous period of time preferably has similarities with the given period of time for which the net energy demand is being predicted. According to an example, a net energy demand predicted for a consumer over a 12-hour period on a Wednesday in July is based on the actual energy demand experienced by the same consumer over the same 12-hour period on the previous Wednesday the week before.

Method 400 further includes determining a first multiple to apply to the received energy consumption profile to satisfy the predicted net energy demand of the consumer system. See operation 408. In other words, operation 408 includes determining a first multiple which, when applied to the received energy consumption profile, produces an updated energy consumption profile which corresponds to an amount of energy that is capable of satisfying the predicted net energy demand of the consumer system. The first multiple is determined differently depending on the approach. However, in some approaches it is preferred that the first multiple be determined using Equation 1 as presented above.

Referring still to FIG. 4A, operation 410 includes fulfilling an actual net energy demand of the consumer system by performing a process for each of the multiple intervals which are included in the period. In other words, operation 410 includes actually satisfying the energy demands of the consumer system at each of the intervals in the period of time.

Figure 4B:
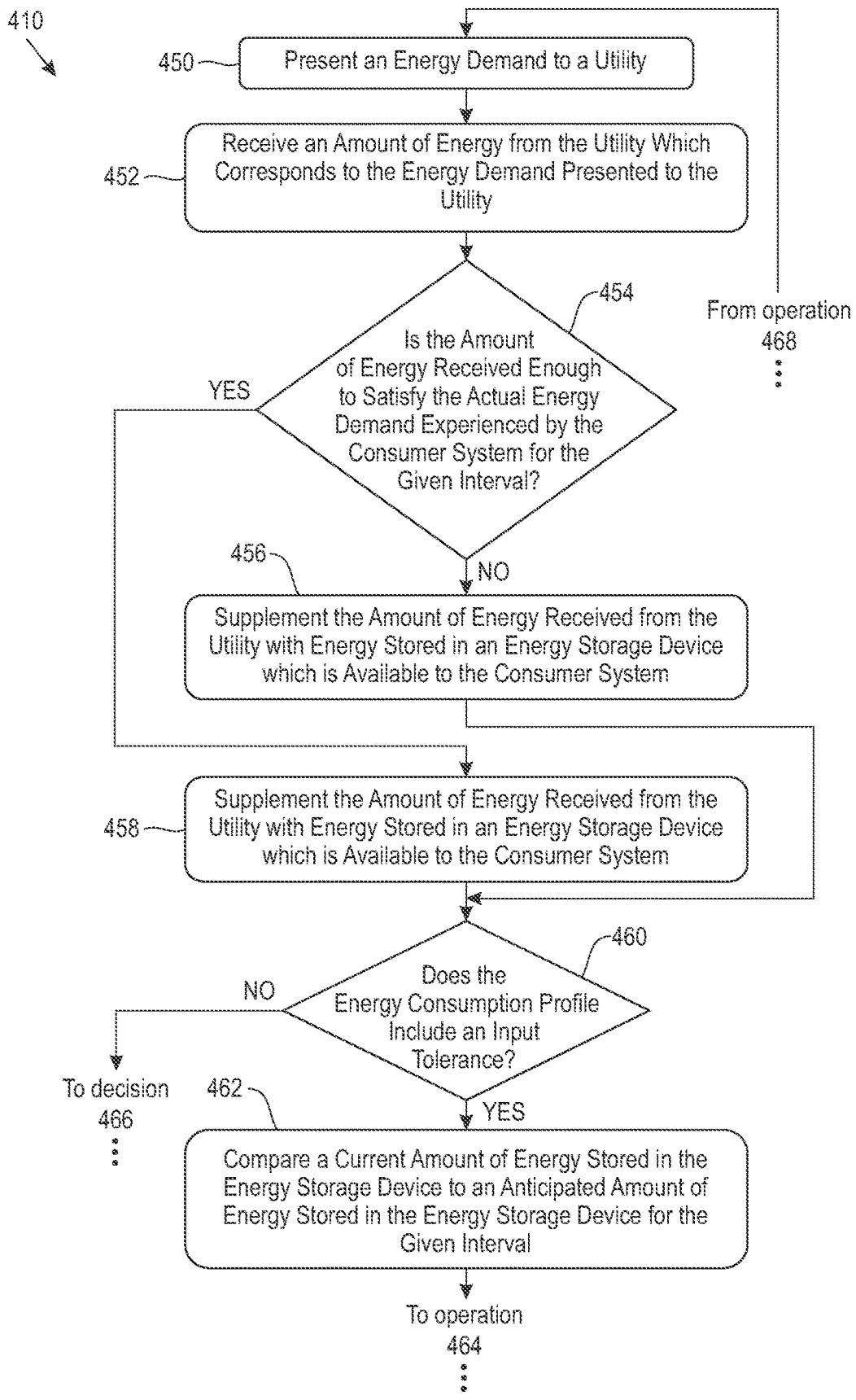
FIG. 4B is a flowchart of sub-processes for one of the operations in the method of FIG. 4A, in accordance with one embodiment.
Figure 4B:
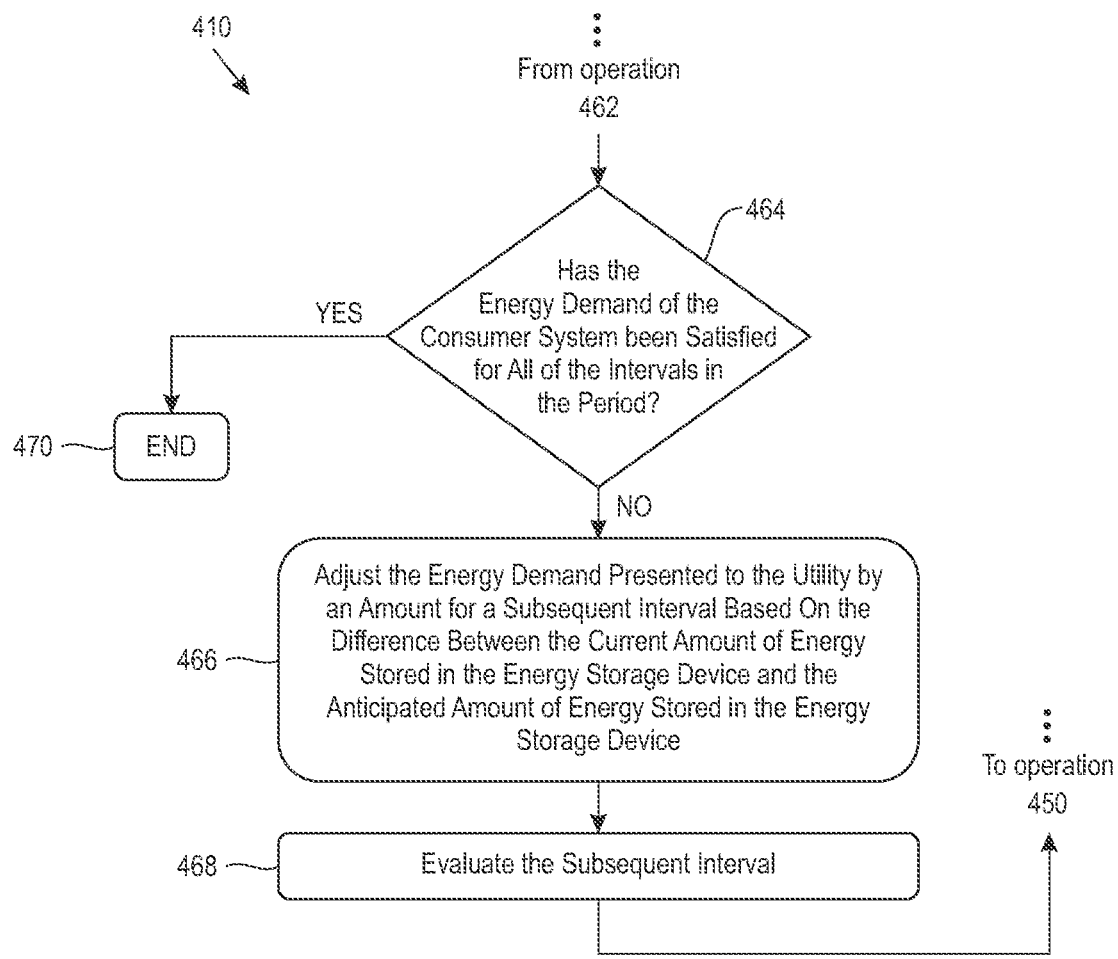

Looking now to FIG. 4B, exemplary sub-processes of actually satisfying the energy demands of the consumer system at each of the intervals in the period are illustrated in accordance with one embodiment, one or more of which may be used to perform operation 410 of FIG. 4A. However, it should be noted that the sub-processes of FIG. 4B are illustrated in accordance with one embodiment which is in no way intended to limit the invention. For example, while the various sub-processes included in FIG. 4B may be performed by a controller (e.g., processor, control unit, computer, etc.) at the consumer system location, any one or more of these sub-processes may be performed by a controller which is located at a different location along the energy delivery grid between the utility and the consumer system and/or which is removed therefrom.

As shown, FIG. 4B includes presenting an energy demand to a utility. See sub-operation 450. The energy demand presented to the utility preferably is equal to a portion of the updated energy consumption profile which corresponds to the given interval of the period. In other words, the energy demand presented to the utility preferably is equal to the first multiple (determined in operation 408 above) applied to a portion of the energy consumption profile which corresponds to the given interval. Moreover, sub-operation 452 includes receiving an amount of energy from the utility which is preferably equal to the energy demand presented to the utility in sub-operation 450. However, it should be reiterated that the energy demand presented to the utility can be higher or lower than the actual energy demand of the consumer system for the given interval depending on the approach. Thus, in some situations the energy received from the utility is supplemented by energy stored in one or more batteries available to the consumer system, energy produced by a local independent energy source, etc., in approaches where the energy received from the utility is less than the actual demand. While in other approaches, a portion of the energy received from the utility is stored in one or more batteries at the consumer location, rerouted (e.g., sold back to) the utility, etc., when the energy received is greater than the actual demand.

Moreover, decision 454 includes determining whether the amount of energy received from the utility is less than the actual net energy demand of the consumer system for the given interval. In other words, decision 454 includes determining whether the amount of energy received is enough to satisfy the actual energy demand experienced by the consumer system for the given interval. The flowchart proceeds to sub-operation 456 in response to determining that the amount of energy received is not enough to satisfy the actual energy demand experienced by the consumer system for the given interval. There, sub-operation 456 includes supplementing the amount of energy received from the utility with energy stored in the energy storage device available to (e.g., located at) the consumer system, e.g., as described in any of the approaches herein.

Returning to decision 454, the flowchart proceeds to sub-operation 458 in response to determining that the amount of energy received is enough to satisfy the actual energy demand experienced by the consumer system for the given interval. There, sub-operation 458 includes using a difference between the amount of energy received from the utility and the actual net energy demand of the consumer system for the given interval to increase the amount of energy stored in the energy storage device. In other words, sub-operation 458 includes supplementing the amount of energy received from the utility with energy stored in an energy storage device which is available to the consumer system. Again, any energy received from the utility which exceeds the energy demand of the consumer system for the given interval is preferably used to recharge the energy storage device such that it is adequately charged to compensate for intervals for which the amount of energy received from the utility is less than the energy demand of the consumer system.

Furthermore, the flowchart proceeds to decision 460 from both sub-operation 456 and sub-operation 458. As shown, decision 460 includes determining whether the energy consumption profile includes an input tolerance. Again, in some approaches the energy consumption profiles are designed and/or prescribed by a utility such that it promotes energy demand restructuring which is beneficial to the utility without forcing consumers to reduce and/or adjust their actual energy use. Energy consumption profiles are prescribed with an input tolerance in some approaches, where the input tolerance defines an acceptable amount by which the energy demand that is actually presented to the utility may deviate from the energy consumption profile. For example, an energy consumption profile includes an input tolerance of ±2% which indicates that the energy demand presented to the utility by a consumer may deviate by less than or equal to 2% over the energy consumption profile which was prescribed, and may deviate by less than or equal to 2% below the energy consumption profile which was prescribed.

Accordingly, input tolerances are used by a consumer in some approaches to deviate slightly from the prescribed energy consumption profile to compensate for trends in which the amount of energy stored in the energy storage device deviates away from an intended amount. As mentioned above, it is desirable that the amount of energy stored in a battery at the consumer location is the same at the end of a period as it was at the beginning of the period. In other words, it is desirable that the net difference in energy charging and use over a given period of time is about zero. This allows for the battery to function nominally over a multitude of periods without triggering any intervention from a user, consumer system administrator, utility provider, etc.

Referring still to FIG. 4B, sub-operation 462 includes comparing a current amount of energy stored in the energy storage device to an anticipated amount of energy stored in the energy storage device for the given interval. In situations where a discrepancy exists between the current and anticipated amounts of energy stored in the energy storage device, it may be desirable to adjust the energy demand which is presented to the utility in a next iteration of the process in order to compensate for the discrepancy. Accordingly, decision 464 includes determining whether the energy demand of the consumer system has been satisfied for all of the intervals in the period. In other words, decision 464 includes determining whether the energy demand of the consumer system has been satisfied for the entire period.

The flowchart proceeds to sub-operation 466 in response to determining that the energy demand of the consumer system has not been satisfied for all of the intervals in the period. There, sub-operation 466 includes adjusting the energy demand presented to the utility by an amount for a subsequent interval based on the difference between the current amount of energy stored in the energy storage device and the anticipated amount of energy stored in the energy storage device. However, it is preferred that the amount by which the energy demand presented to the utility is adjusted is less than or equal to the input tolerance. In other words, it is preferred that the energy demand presented to the utility does not deviate from the prescribed energy consumption profile an undesirable amount.

Sub-operation 468 further includes evaluating the subsequent interval before returning to sub-operation 450. However, returning to decision 464, the flowchart proceeds to sub-operation 470 in response to determining that the energy demand of the consumer system has been satisfied for all of the intervals in the period, whereby the process illustrated in FIG. 4B ends.

It follows that various embodiments included herein are able to manage and stabilize energy consumption at a consumer location without implementing control of individual consumer locations by a utility. As described above, utilizing an input shape and historically measured data for internal demand prediction is able to achieve reasonable estimations for the battery size associated with feasibly and sustainably transforming the predicted energy demands for a consumer each period (e.g., day) into a profile that is proportional to a desired profile.

Although power demands may also be reduced, this improvement in energy consumption stabilization is achievable irrespective of power demand minimization at the consumer level. Thus, any of the approaches included herein may be implemented to improve the stability of energy demand on a nuclear level of one or more consumers, which include IoT devices, independent energy sources having features which may be manipulated, an intelligent battery to store and/or distribute power, etc., or any other electrical based components. Achieving machine-to-machine communication as described herein introduces the potential to improve efficiency for the allocation of energy within a complex power distribution system, e.g., such as an electrical grid. Energy consumption is an economic area that extends to every member of society, thereby providing energy companies the opportunity to implement tiered models to maximize profits, reduce energy losses and optimize generation. Moreover, these enhancements may be increased even further by incentivizing consumers to actively stabilize power demands. It follows that various ones of the embodiments included herein provide the design and exemplary operation of an estimator that which is able to select a battery size (energy storage capacity) which is able to achieve the periodic (e.g., daily) reshaping of consumer internal energy demands presented to a utility. This reshaped demand is preferably in a shape that is proportional to an input shape supplied by the utility.

Various ones of the approaches included herein may also be implemented in conjunction with a reward system which is based on a correlation of the received energy consumption profile to the net energy demand of the consumer system over the period of time. In other words, energy price discounts are returned to consumers based on the daily shape of the demand as opposed to tariffs based on time-of-day but independent of the amount of demand. This relationship may further be represented in a reward table (e.g., lookup table). The reward table is received from the utility in some approaches, and may outline a system for rewarding stability of power demanded by a consumer and consequently placed on the utility. The reward table may be stored in memory at the consumer location, accessed by the consumer at a designated location (e.g., a Uniform Resource Locator (URL)), provided to the consumer upon request, etc. depending on the approach. Moreover, the reward table may be predetermined, updated over time, adjusted in real-time, replaced with an alternative system of determining selecting and/or setting a target power demand, etc., according to various approaches.

Improvements to the overall performance of a utility are returnable to the consumer in the form of a reward, e.g., as a part of an incentive program. Although an incentive program may be structured any number of ways in various approaches, according to an illustrative approach, the incentive program is implemented by a utility company, in which consumer power demands are monitored over a first window of time. Moreover, a reward corresponding to the actual energy consumption profile of a consumer and a prescribed energy consumption profile, is given to the consumer by the utility company. The reward is correlated with the difference such that the smaller the difference between the prescribed and actual energy consumption profiles corresponds to a higher reward in some approaches.

In-Use Examples

Figure 5:
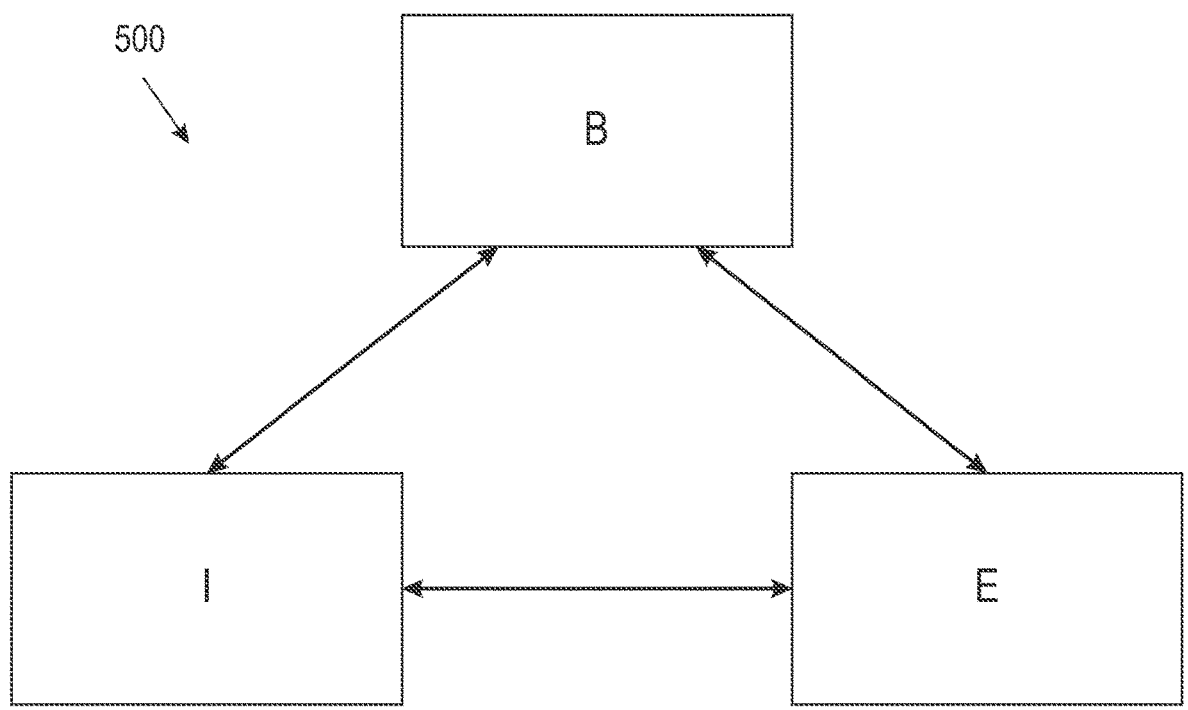
FIG. 5 is a representative view of a relationship which exists between different nodes of an energy-based architecture, in accordance with one embodiment.

According to an in-use example, which is in no way intended to limit the invention, FIG. 5 illustrates a representative view of the relationships which exists between nodes of an energy-based architecture 500. As shown, the energy-based architecture 500 includes a battery (e.g., an energy storage device) B, the external demand E which is presented by a consumer system, and the internal demand I which is actually experienced by the consumer storage system. It follows that electrical energy may flow from the external demand box E to either the battery B or the internal demand box I. Similarly, electrical energy may flow to the internal demand box I from either the battery B or the external demand box E.

Thus, the total energy consumed in I during an interval of time x is the sum of the energy from B and the energy from E during x, as represented by $I(x)=B \times I(x)+E \times I(x)$. Moreover, the total energy demanded at E during an interval of time x is the sum of the energy sent from E to B and the energy sent from E to I during x, as represented by $E(x)=E \times B(x)+E \times I(x)$. Furthermore, the net change in the energy stored at B during an interval of time x is the difference between the energy sent from E to B and the energy sent from B to I during x as represented by $B(x)=E \times B(x)-B \times I(x)$. It should be noted that the flow E×B may have a negative value (indicating a sale of electricity to the utility) and the consumer may employ a method for generating electricity locally to augment what is available from the utility and the battery.

The corresponding battery state (current charge level and available capacity) may be estimated such that an initial state of the battery may be targeted Target, assuming the estimation is accurate. Specifically, for each specified period p, given $S(x,p)$ (i.e., the desired energy profile at interval x for period p), and $I(x,p)$ (i.e., the energy demand at I for each interval x in period p, schedule the energy presented $E(x,p)=C(p)*S(x,p)$, where $C(p)=Sum(I(x,p))/Sum(S(x,p))$, assuming $Sum(S(x,p))$ is not zero. The worst positive accumulated change in the energy contained in the battery (WPAC) is measured, where the accumulation restarts over each period. Similarly, the worst negative accumulated change (WNAC) is also measured. Thus, the "high" state for the battery may be represented as High=Low+WPAC+WNAC, and the target state for the battery may be represented as Target=Low+WNAC.

Accordingly, by measuring the worst positive accumulated prediction error WPAPE and the worst negative accumulated prediction error WNAPE over an input history containing predicted demand Ip and actual demand I for a specified set of consecutive periods, the initial state of the battery may be more accurately estimated. To make such measurements, for a period p, the accumulated prediction error through interval x may be represented as $APE(x,p)=Sum(I(y,p)-Ip(y,p)|y<=x)$. Thus, WPAPE for a period p is represented as $WPAPE(p)=Max(O, APE(x,p))$ over all intervals x the period p, and WNAPE for a period p is represented as $WNAPE(p)=Max(O, -APE(x,p))$ over all intervals x in the period p.

Moreover, in order to achieve a use situation where the state of the battery is the same at the beginning of the period as at the end of the period, set $E(x,p)=(Cp(p)) \times S(x,p)$ for each period p based on the distance between the energy in the battery at the end of day p−1. Based on this information, a feasible multiple b is preferably found such that the energy stored in the battery is constantly between High+(WDPAPE+WDNAPE)×b, and Low when the initial energy stored in B is Low+WDNAPE. Moreover, the estimated battery state may be represented as High−Low+(WDPAPE+WDNAPE)×b. According to a preferred approach, if the given period p is the first period, the initial distance from Target is assumed to be zero and $Cp(p)=Sum(Ip(x,p))/Sum(S(x,p))$, otherwise, if Finish(p−1) is the ending value for energy stored in the battery on period p−1, then $Cp(p)=(Target-Finish(p-1)+Sum(Ip(x,p)))/Sum(S(x,p))$. Moreover, Set $E(x,p)=Cp(x,p)*S(x,p)$.

However, in other approaches, when a tolerance T(p) is allowed such that any value of E(x,p) with $(1-T(p))*Cp(x,p)*S(x,p)<=E(x,p)<=(1+T(p))*Cp(x,p)*S(x,p)$, then the value of E(x,p) may be chosen based on the distance (Target−Finish(p−1)) and based on APE(x−1,p), subject to the tolerance constraint. The choice of E(x,p) may also be based on the proximity to the feasibility bounds.

According to another in-use example, which is in no way intended to limit the invention, a standard period (e.g., a 24 hour span) is uniformly partitioned into standard intervals (e.g., 2 minute intervals).

Moreover, weather forecasts for the standard period are received. According to the example, the weather forecasts include time series for temperature corresponding to the standard intervals in a standard period and including calendar metadata. Corresponding to each weather forecast, a time series (profile) describing the demand experienced from each consumer device at each standard interval of the standard period is preferably determined. a profile describing the CTMD of the utility at each standard interval of the forecast standard period is also preferably determined for each of the weather forecasts. Furthermore, a profile describing the CTMD of an alternate power source, if any, (e.g. solar panels, a wind mill, etc.) is determined for the consumer at each standard interval of the forecast standard period, based at least in part on the weather forecasts.

As a result, a partitioning of the space of the weather forecast values and calendar metadata is achieved. More specifically, for each partition a distribution (e.g., histogram) of the sum of energy demand values over all consumer devices at each standard interval of a standard period is determined. Moreover, for each partition, a distribution (e.g., histogram) of the CTMD of the utility (and likewise for any alternate power source) at each standard interval of a standard period is achieved.

In order to achieve these desirable results, the following processes may be implemented.

First, assume b is the factor representing the cost in energy loss of storing energy in a battery accessible to a consumer. Moreover, for each weather forecast f and each standard interval i, let C(f,i)=the forecast utility capacity to meet demand at interval i in the forecast period, and D(f,i)=the sum of consumer device demand measured (or estimated) at interval i in the forecast period (less any alternate source capacity to meet demand measured (or estimated) available at interval i). Additionally, for each forecast f let: $TC(f)=Sum(C(f,i))$ over i in the forecast period; $TD(f)=Sum(D(f,i))$ over i in the forecast period; $c(f)=TD(f)/TC(f)$; $R(f,c)=(1+b)*Max(j<=i)(Sum(C(f,j)*c-D(f,j)))$ over i in the forecast period; and $S(f,c)=Max(j<=i)(Sum(D(f,j)-C(f,j)*c))$ over i in the forecast period.

The state of battery is represented as (E, F), where E is the energy stored and F is full capacity, while M represents a minimum amount of stored energy used in performing a safe shutdown of the consumer's system without access to utility power. Thus, E is decremented by M.

A target demand profile, in some approaches, is determined as follows. Given a forecast f, with utility forecast profile C(f,i), the demand D(f,i) may be estimated by finding forecasts closest to f in history, using linear interpolation and extrapolation. Moreover, Euclidean distance in temperature, energy and power are applied. Feasibility constraints are set as being: $E>S(f,c)$ and $F-E>R(f,c)$, while sustainability constraints are set as being: if $F/E>=2+b$ then $c>=c(f)$ else $c<=c(f)$.

A near optimal value of c is selected, subject to the above feasibility and sustainability constraints. According to the present description, an "optimal" value of c is one that would result in F/E as close as possible to 2+b, but on the same side of 2+b as the initial F/E, if the actual demand profile were precisely represented by D(f,i). Moreover, the target demand profile is represented as $c*C(f,i)$. Accordingly, provided that F is sufficiently large and the initial ratio F/E is sufficiently close to the desired threshold (2+b), the ratio of F/E will be maintained close to the desired threshold.

In implementation, the loss curves on energy stored in a battery may show a 10% loss in stored energy over 24 hours. Accordingly, an estimate for the factor b is determined for the 10% loss, thereby suggesting 2.1 as the desired ratio of F to E. However, this serves as a rough estimate. The factor b likely depends on the actual pattern of activity at the battery and on the battery architecture. In some approaches the value of b may be replaced by a function of the forecast demand and additionally acquired information.

According to yet another in-use example, which again is in no way intended to limit the invention, a constant multiple is applied to a utility prescribed energy consumption profile, the constant multiple being based on an amount of energy stored in an energy storage device (e.g., battery), and the amount of capacity left to store energy in the energy storage device.

Choosing the constant multiple includes computing a first ratio between the sum of the estimated demand over the period and the sum of the utility supplied profile amounts over the period. When a second ratio (the result of dividing the total energy capacity of the energy storage device by the current energy stored) is at least/at most a pre-specified threshold restricting the choice of constant multiple to values at least/at most the first ratio respectively, the choice of the constant multiple is further restricted so that the energy storage device is not requested to supply more energy than initially stored and/or accept more energy than a total capacity of the energy storage device. The estimated amount of energy stored in the storage device desired may be decremented by the minimum amount of energy associated with performing a safe shutdown. Furthermore, the second ratio is modified based on a learned function which corresponds to the forecast demand that predicts the energy loss from the energy storage device due to the time it has been stored.

According to another in-use example, pseudocode for a process having exemplary constants for various threshold values is presented below. One constant target value Target is applied for B(0,d), for each day d. It may be assumed that the estimation process starts with B(0,1)=Target. Moreover, a simulation process attempts to maintain B(0, d) near Target. The Estimator module in training mode receives inputs, S, Ip and I over a specified sequence of consecutive days D for training and D' for testing, where S(x, d) specifies the shape for day d.

For economy of notation, an operator Aggregate on functions f(x, d) are represented as follows:

Aggregate(f)(x, d)=Sum{f(y, d) I y<=x};
Aggregate(f)(d)=Sum{f(x, d) Ix an interval of d};
The operator P on functions f(x, d) and sets of days D as:
P(f)(D)=Max{Max(O, Aggregate(f)(x, d))Id in D, x in d}.
It may be assumed that Aggregate(S)(d) is never zero. The computation proceeds in the following steps:

Assuming ideal prediction Ip=I and Ep=E.
for d in D,
   M(d)=Aggregate(I)(d)/Aggregate(S)(d);
   For x in d, E(x, d)=M(d)*S(x, d);
MinTarget(D)=Low+P(I−E)(D);
MinFull(D)=MinTarget(D)+P(E−I)(D)−Low;
Measuring Worst Positive and Negative Prediction Error.
WPPE(D)=P(I−Ip)(D);
WNPE(D)=P(Ip−I)(D);
Operating simulator on test data D'.
for d in D',
   Dev(d)=if d==1 then 0 else B(96,d−1)−Target;
   M(d)=(Aggregate(Ip)(d)−Dev(d))/Aggregate(S)(d);
   For x in d,
     Ep(x, d)=M(d)*S(x, d);
     A(x, d)=Aggregate(Ip−I)(x−1, d)*Tolerance*Ep(x, d);
     E(x, d)=Ep(x, d)+A(x, d);
     B(x, d)=B(0, d)+Aggregate(E−I)(x, d);

Finding minimum feasible PEM with "divide and conquer" which serves as an exemplary method for dividing the distance between a feasible example and in infeasible example by 2 at each iteration, until the desired accuracy is achieved. This method proceeds by determining the feasibility of the value half way between the feasible and infeasible values, e.g., as shown in the pseudocode below.

PEM=0.5;
Target=MinTarget(D)+(PEM*WNPE(D));
Full=MinFull(D)+(PEM*WPPE(D));
High=Low+Full;
If for d in D', x in d, Low<=B(x, d)<=High then
   PEM is feasible;
Else PEM is infeasible;
Iterate, divide and conquer until the difference between successive feasible values of PEM is below 0.001;
Output PEM, Target, and Full.

According to another in-use embodiment, which is in no way intended to limit the invention, an Estimator module is used to estimate a battery state which is capable of adequately supplementing the energy demands of a given consumer system, e.g., as mentioned above. The output of the Estimator module in stand-alone mode is a minimum battery size, Full_min and a minimum state of the battery [Estart_min, Full_min−Estart_min] at the beginning of each day (which constitutes a period in the present example). A sustainability assignment is applied which specifies that the battery state at the beginning of the day should also be the battery state at the end of the day, provided a perfectly accurate energy forecast. The battery size (capacity) is represented by an unknown variable 'Full'. If the battery state at the end of the day is represented by [Efinish, Ful_min−Efinish], the corresponding sustainability requirement may be represented as Efinish=Estart_min. It should be noted that, for every battery state [E[x], Full−E[x]], the relationship 0<=E[x]<=Full is held for feasibility.

By fixing the battery size, the foregoing example operates successfully by determining a suitable constant of proportionality for each day (period), and executing the resulting schedule with a slight modification. At the end of each interval in the day, an additional (possibly negative) amount of energy is added to the scheduled amount of external consumption for the next interval. The additional amount is the amount closest to zero that is within the allowed tolerance and is expected to bring the actual battery state as close as possible to the target state. At the end of each period, any deviation from the original Estart may be compensated for, as well as prediction error bias, by adjusting the proportionality constant Cm. This may be represented by the following formula: Cm=(AggregateD[N−1]−Deviation)/AggregateC[N−1] where Deviation=B[0]−Estart.

Furthermore, it should be noted that while various ones of the embodiments included herein focus on the management of demand for electrical energy, any of the embodiments included herein may be applied in a variety of different industries that use metered services for a commodity that can be stored. These commodities include water, natural gas and other fuels, internet services (e.g., streaming and cloud services, especially cloud storage), etc., as would be appreciated by one skilled in the art after reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving an energy consumption profile which spans multiple intervals in a period of time;
predicting a net energy demand of a consumer system over the period of time;
determining a first multiple which, when applied to the received energy consumption profile, produces an updated energy consumption profile which corresponds to an amount of energy that is capable of satisfying the predicted net energy demand of the consumer system;
estimating a greatest amount of underprediction by which the predicted net energy demand of the consumer system underpredicts an actual net energy demand of the consumer system over the period of time;

estimating a greatest amount of overprediction by which the predicted net energy demand of the consumer system overpredicts the actual net energy demand of the consumer system over the period of time;

computing an initial state of an energy storage device electrically coupled to the consumer system which is able to satisfy the actual net energy demand of the consumer system according to the updated energy consumption profile; and fulfilling the actual net energy demand of the consumer system by performing a process for each of the multiple intervals, wherein the initial state of the energy storage device is based on a second multiple applied to each of the greatest amount of underprediction, and the greatest amount of overprediction.

2. The computer-implemented method of claim 1, wherein the initial state of the energy storage device includes a total capacity of the energy storage device, and includes an initial amount of energy stored in the energy storage device.

3. The computer-implemented method of claim 1, wherein performing the process for each of the multiple intervals includes:

presenting an energy demand to a utility, the energy demand corresponding to a portion of the updated energy consumption profile which corresponds to the given interval, receiving an amount of energy from the utility which corresponds to the energy demand presented to the utility, determining whether the amount of energy received from the utility is less than the actual net energy demand of the consumer system for the given interval, supplementing the amount of energy received from the utility with energy stored in the energy storage device in response to determining that the amount of energy received from the utility is less than the actual net energy demand of the consumer system for the given interval, and using a difference between the amount of energy received from the utility and the actual net energy demand of the consumer system for the given interval to increase the amount of energy stored in the energy storage device in response to determining that the amount of energy received from the utility is not less than the actual net energy demand of the consumer system for the given interval.

4. The computer-implemented method of claim 1, wherein determining the second multiple includes:

using an input trial value to compute an energy storage device state; and performing an iterative process, wherein the iterative process searches for a smallest value which corresponds to an energy storage device state that is capable of satisfying the actual net energy demand of the consumer system, wherein the iterative process is performed during a test run of the consumer system.

5. The computer-implemented method of claim 1, wherein predicting the net energy demand of the consumer system over the period of time is based on a net energy demand of the consumer system experienced over a previous period of time.

6. The computer-implemented method of claim 1, wherein the energy storage device includes a battery, wherein the energy consumption profile is a prescribed energy consumption profile which is provided by a utility.

7. The computer-implemented method of claim 1, wherein the energy storage device is coupled to a utility and an independent energy source located locally, wherein the energy storage device is configured to accept electrical energy from the independent energy source and the utility concurrently.

8. A computer-implemented method, comprising:

receiving a prescribed energy consumption profile which spans multiple intervals in a period of time, wherein the prescribed energy consumption profile is provided by a utility;

predicting a net energy demand of a consumer system over the period of time;

determining a first multiple to apply to the received energy consumption profile to satisfy the predicted net energy demand of the consumer system, wherein the first multiple is determined based on an amount of energy stored in an energy storage device electrically coupled to the consumer system and a total energy storage capacity of the energy storage device; and fulfilling an actual net energy demand of the consumer system by performing a process for each of the multiple intervals, the process including:

presenting an energy demand to a utility, the energy demand corresponding to the first multiple applied to a portion of the energy consumption profile which corresponds to the given interval, receiving an amount of energy from the utility which corresponds to the energy demand presented to the utility, determining whether the amount of energy received from the utility is less than the actual net energy demand of the consumer system for the given interval, supplementing the amount of energy received from the utility with energy stored in the energy storage device in response to determining that the amount of energy received from the utility is less than the actual net energy demand of the consumer system for the given interval, and using a difference between the amount of energy received from the utility and the actual net energy demand of the consumer system for the given interval to increase the amount of energy stored in the energy storage device in response to determining that the amount of energy received from the utility is not less than the actual net energy demand of the consumer system for the given interval.

9. The computer-implemented method of claim 8, the process including:

determining whether the energy consumption profile includes an input tolerance;

comparing a current amount of energy stored in the energy storage device to an anticipated amount of energy stored in the energy storage device for the given interval in response to determining that the energy consumption profile includes an input tolerance; and adjusting the energy demand presented to the utility by an amount for a subsequent interval based on the difference between the current amount of energy stored in the energy storage device and the anticipated amount of energy stored in the energy storage device, wherein the amount that the energy demand presented to the utility is adjusted is less than or equal to the input tolerance.

10. The computer-implemented method of claim 8, wherein predicting the net energy demand of the consumer system over the period of time is based on a net energy demand of the consumer system experienced over a previous period of time.

11. The computer-implemented method of claim 8, wherein the energy storage device includes a battery.

12. The computer-implemented method of claim 8, wherein the energy storage device is coupled to the utility and an independent energy source located locally, wherein the energy storage device is configured to accept electrical energy from the independent energy source and the utility concurrently.

13. A computer program product comprising a computer readable storage medium having program instructions embodied therewith, wherein the computer readable storage medium is not a transitory signal per se, the program instructions readable and/or executable by a processor to cause the processor to perform a method comprising:
   receiving, by the processor, an energy consumption profile which spans multiple intervals in a period of time;
   predicting, by the processor, a net energy demand of a consumer system over the period of time;
   determining, by the processor, a first multiple which, when applied to the received energy consumption profile, produces an updated energy consumption profile which corresponds to an amount of energy that is capable of satisfying the predicted net energy demand of the consumer system;
   estimating, by the processor, a greatest amount of underprediction by which the predicted net energy demand of the consumer system underpredicts an actual net energy demand of the consumer system over the period of time;
   estimating, by the processor, a greatest amount of overprediction by which the predicted net energy demand of the consumer system overpredicts the actual net energy demand of the consumer system over the period of time; and
   computing, by the processor, an initial state of an energy storage device electrically coupled to the consumer system which is able to satisfy the actual net energy demand of the consumer system according to the updated energy consumption profile,
   wherein the initial state of the energy storage device is based on a second multiple applied to each of the greatest amount of underprediction, and the greatest amount of overprediction,
   wherein determining the second multiple includes:
   using an input trial value to compute an energy storage device state; and
   performing an iterative process, wherein the iterative process searches for a smallest value which corresponds to an energy storage device state that is capable of satisfying the actual net energy demand of the consumer system, wherein the iterative process is performed during a test run of the consumer system.

14. The computer program product of claim 13, wherein predicting the net energy demand of the consumer system over the period of time is based on a net energy demand of the consumer system experienced over a previous period of time.

15. The computer program product of claim 13, wherein the energy storage device includes a battery.

16. The computer program product of claim 13, wherein the energy storage device is coupled to a utility and an independent energy source located locally, wherein the energy storage device is configured to accept electrical energy from the independent energy source and the utility concurrently.

17. The computer program product of claim 13, wherein the initial state of the energy storage device includes a total capacity of the energy storage device, and includes an initial amount of energy stored in the energy storage device.

18. The computer program product of claim 13, the program instructions being readable and/or executable by the processor to cause the processor to perform the method comprising:
   fulfilling, by the processor, an actual net energy demand of the consumer system by performing a process for each of the multiple intervals, the process including:
   presenting an energy demand to a utility, the energy demand corresponding to a portion of the updated energy consumption profile which corresponds to the given interval,
   receiving an amount of energy from the utility which corresponds to the energy demand presented to the utility,
   determining whether the amount of energy received from the utility is less than the actual net energy demand of the consumer system for the given interval,
   supplementing the amount of energy received from the utility with energy stored in the energy storage device in response to determining that the amount of energy received from the utility is less than the actual net energy demand of the consumer system for the given interval, and
   using a difference between the amount of energy received from the utility and the actual net energy demand of the consumer system for the given interval to increase the amount of energy stored in the energy storage device in response to determining that the amount of energy received from the utility is not less than the actual net energy demand of the consumer system for the given interval.

* * * * *